United States Patent
Goi et al.

(10) Patent No.: US 9,529,151 B2
(45) Date of Patent: Dec. 27, 2016

(54) POLARIZATION CONVERSION ELEMENT

(71) Applicant: FUJIKURA LTD., Koto-ku, Tokyo (JP)

(72) Inventors: Kazuhiro Goi, Sakura (JP); Akira Oka, Sakura (JP); Hiroyuki Kusaka, Sakura (JP); Kensuke Ogawa, Sakura (JP)

(73) Assignee: FUJIKURA LTD., Toyko (JP)

( * ) Notice: Subject to any disclaimer, the term of this patent is extended or adjusted under 35 U.S.C. 154(b) by 0 days.

(21) Appl. No.: 14/976,868

(22) Filed: Dec. 21, 2015

(65) Prior Publication Data
US 2016/0178842 A1   Jun. 23, 2016

Related U.S. Application Data

(63) Continuation of application No. PCT/JP2013/073570, filed on Sep. 2, 2013.

(30) Foreign Application Priority Data

Jun. 27, 2013   (JP) .................................. 2013-135492

(51) Int. Cl.
*G02B 6/12*   (2006.01)
*G02B 6/126*   (2006.01)
(Continued)

(52) U.S. Cl.
CPC .............. *G02B 6/126* (2013.01); *G02B 6/1228* (2013.01); *G02B 6/14* (2013.01);
(Continued)

(58) Field of Classification Search
CPC .............. G02B 6/12; G02B 6/122; G02B 6/126
(Continued)

(56) References Cited

U.S. PATENT DOCUMENTS 5,245,465 A *   9/1993   Tomita et al. ................. 359/246
7,792,403 B1 *   9/2010   Little et al. ...................... 385/43
(Continued)

FOREIGN PATENT DOCUMENTS

WO   00/58776 A1   10/2000
WO   2008/066159 A1   6/2008

OTHER PUBLICATIONS

Communication dated Jun. 7, 2016, from the Japanese Patent Office in counterpart application No. 2014-555653.
(Continued)

*Primary Examiner* — Kaveh C Kianni
(74) *Attorney, Agent, or Firm* — Sughrue Mion, PLLC

(57) ABSTRACT

A polarization conversion element is disclosed in which an optical waveguide formed on a substrate sequentially includes a first waveguide portion, a polarization rotation portion, and a second waveguide portion, an effective refractive index of a TE mode having the highest effective refractive index in an eigen mode of waveguide light on a sectional surface of the first waveguide portion is higher than an effective refractive index of a TM mode having the highest effective refractive index, an effective refractive index of the TM mode having the highest effective refractive index on a sectional surface of the second waveguide portion is higher than an effective refractive index of the TE mode having the highest effective refractive index, and heights of waveguide structures (for example, cores) of the first waveguide portion and the second waveguide portion are equal to each other.

17 Claims, 19 Drawing Sheets

(51) Int. Cl.
*G02B 6/14* (2006.01)
*G02B 6/122* (2006.01)

(52) U.S. Cl.
CPC .............. *G02B 2006/1209* (2013.01); *G02B 2006/12097* (2013.01); *G02B 2006/12142* (2013.01); *G02B 2006/12152* (2013.01); *G02B 2006/12164* (2013.01)

(58) Field of Classification Search
USPC .......................................................... 385/11
See application file for complete search history.

(56) References Cited

U.S. PATENT DOCUMENTS

| | | | |
|---|---|---|---|
| 2005/0254128 A1* | 11/2005 | Watts | 359/558 |
| 2006/0018584 A1* | 1/2006 | Watts et al. | 385/11 |
| 2008/0019637 A1* | 1/2008 | Little et al. | 385/28 |
| 2010/0002989 A1* | 1/2010 | Tokushima | 385/14 |
| 2012/0163750 A1* | 6/2012 | Chen | 385/3 |

OTHER PUBLICATIONS

Long Chen et al., "Compact polarization rotator on silicon for polarization-diversified circuits", Optics Letters, Feb. 15, 2011, pp. 469-471, vol. 36, No. 4.

Jing Zhang et al., "Silicon-Waveguide-Based Mode Evolution Polarization Rotator", IEEE Journal of Selected Topics in Quantum Electronics, Jan./Feb. 2010, pp. 53-60, vol. 16, No. 1.

Junji Yamauchi et al., "Return Loss of an L-figured and Sloped Waveguide-type Polarization Converters", IEICE, 2011, pp. 227, C-3-52.

C. Alonso-Ramos et al., "Polarization rotator for InP rib waveguide", Optics Letters, Feb. 1, 2012, pp. 335-337, vol. 37, No. 3.

Qing Fang et al., "Suspended optical fiber-to-waveguide mode size converter for Silicon photonics", Optics Express, Apr. 12, 2010, pp. 7763-7769, vol. 18, No. 8.

Masaru Zaitsu et al., "Efficiency and Fabrication Tolerance of Helf-Ridge InP/InGaAsP Polarization Converters", The 18th OptoElectronics and Communications Conference, 2013, WL3-1.

Japanese Office Action of JP Application No. 2014-555653 dated Nov. 17, 2015.

* cited by examiner

FIG. 7
(a)
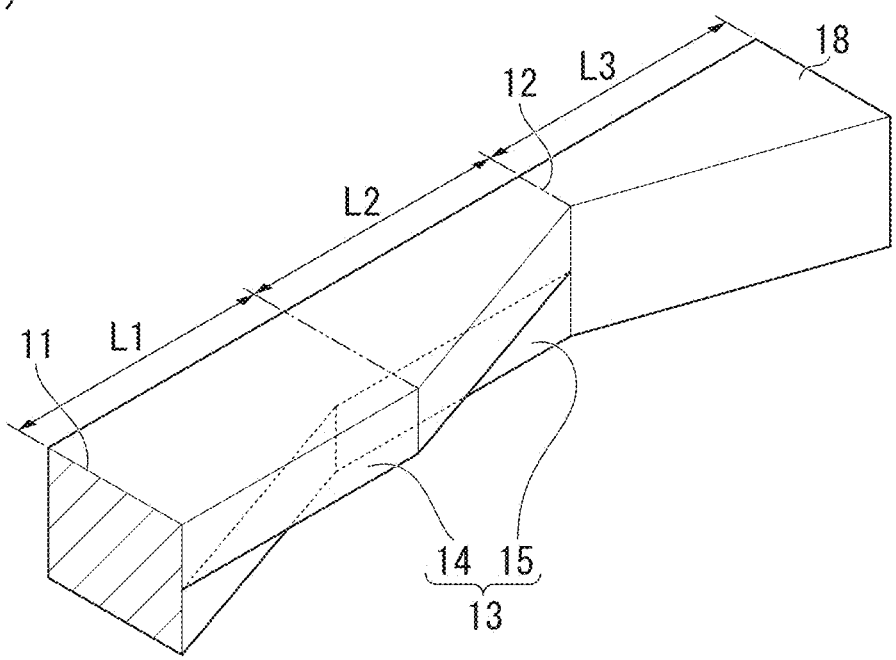
(b)
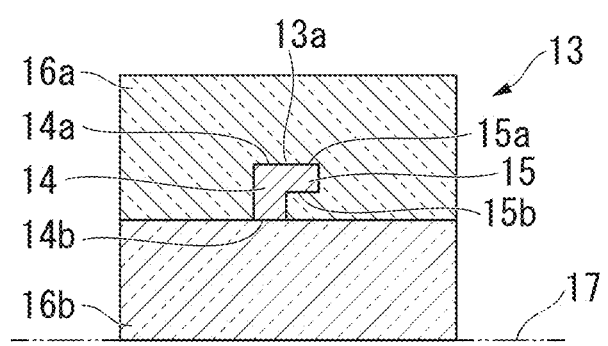

POLARIZATION CONVERSION ELEMENT

CROSS REFERENCE TO RELATED APPLICATIONS

This application is a continuation application based on a PCT Patent Application No. PCT/JP2013/073570, filed Sep. 2, 2013, whose priority is claimed on Japanese Patent Application No. 2013-135492 filed Jun. 27, 2013, the entire contents of which are hereby incorporated by reference.

BACKGROUND OF THE INVENTION

Field of the Invention

The present invention relates to a structure of an optical waveguide element manufactured on a substrate, and in particular, relates to a polarization conversion element which is for converting a polarized wave.

Description of the Related Art

The amount of information used in optical communication has steadily increased recently. Thus, in order to cope with such an increase in the amount of information, a countermeasure such as an acceleration in signal speed and an increase in the number of channels due to wavelength multiplex communication has proceeded in an optical communication network such as backbone, metro, and access. According to this, a system necessary for optical communication becomes complex, and problems such as an increase in the size or an increase in the cost, and an increase in the power consumption of the system occur.

In addition, similarly, even in data centers, which have increased in number in recent years, it is urgently necessary to cope with an increase in the amount of information. In communication between computers in the data center, an electrical signal is mainly transmitted through a metal cable of the related art, but recently, optical communication using an optical fiber has been used from a demand for a further acceleration or a further decrease in the power consumption. Further, even in a board, in a CPU, and each level of a computer, the introduction of optical communication becomes a problem.

As a technology for solving such problems in the optical communication network and for realizing the introduction of optical communication to a new field, recently, an optical device using a high refractive index material such as silicon, InP, and GaAs has attracted attention in addition to an optical integrated circuit of quartz PLC which has been used in the related art, a high-speed operating device of a ferroelectric body such as lithium niobate, and the like, and research and development of a substrate type optical waveguide element device has proceeded in many fields.

The wavelength of light in a medium is in reverse proportion to the refractive index of the medium, and thus in silicon having a high refractive index of approximately 3.5, the dimension of an optical waveguide such as a core width decreases. In addition, a medium having a largely different refractive index with respect to silicon such as silica is set to a cladding, and thus an optical waveguide having strong light-trapping properties is obtained. Regarding characteristics thereof, a radius of curvature can be decreased. For these reasons, it is possible to reduce the size of the optical device using the optical waveguide, a reduction in the size can be realized in the same function, and a plurality of functions can be realized in the same size. In addition, electrical control can be performed by using the fact that silicon is a semiconductor material, and a property variable device such as an optical modulator can be realized (refer to PCT International Publication No. WO00/58776).

Further, a technology and a device relevant to manufacturing of the optical device using silicon have many common elements with a technology and a device relevant to a semiconductor process used in manufacturing of a semiconductor device such as a CPU and a memory of the related art. It is possible to expect that an optical device can be realized with low cost due to mass production. By integrating the semiconductor device and the optical device of the related art on the same substrate, it is possible to connect the semiconductor device to the optical device on the substrate. So far, an electrical signal on metal wiring has been used for the connection between the devices, but in the future, a part of the signal will be replaced with light, and thus a further acceleration in an apparatus and a reduction in power consumption are likely to be realized.

A planar optical waveguide used in such a substrate type optical component has asymmetry in an azimuth direction in a sectional direction of the waveguide, unlike a cylindrical symmetrical optical fiber. Accordingly, the planar optical waveguide has different properties with respect to waveguide light (polarization) in a different deflection direction. In the planar optical waveguide, for the sake of convenience, a waveguide mode in which a main electric field is in a horizontal direction with respect to the substrate is indicated by a TE mode, and a waveguide mode in which a main electric field is in a vertical direction with respect to the substrate is indicated by a TM mode. When the structure of the planar optical waveguide in the vertical direction is different from the structure of the planar optical waveguide in the horizontal direction, the two modes have different effective refractive indices. For this reason, it is difficult to manufacture a device having the same properties with respect to both of the polarizations on the flat substrate. Therefore, a structure referred to as polarization diversity is used in which the two modes are rotated. In this polarization diversity, a polarization rotator which performs conversion of the polarization between the TE mode and the TM mode is necessary.

In addition, in a recent high-speed optical communication method, a polarization multiplexing technology is performed in which different signals are imposed on two polarizations which are orthogonal to each other at the time of transmitting the optical fiber, and in this transceiver, an elemental technology of separating, multiplexing, or converting the polarization is necessary.

Among them, the following elements have been considered as a substrate-integrated polarization conversion element.

In L. Chen, C. R. Doerr, and Y.-K. Chen, "Compact polarization rotator on silicon for polarization-diversified circuits," Optics letters, Vol. 36, Issue 4, pp. 469-471 (2011), a polarization conversion element manufactured on a silicon substrate is disclosed. In the above-described document, a structure is formed on an upper portion of a waveguide by using silicon nitride ($Si_3N_4$) having a different refractive index with respect to the waveguide of silicon. However, a process using $Si_3N_4$ is necessary, and thus it is difficult to form the waveguide. In addition, in a portion to which $Si_3N_4$ is applied, ideally, it is preferable that a tip end of $Si_3N_4$ be manufactured to be extremely narrow, but in an actual process for mass production, the limit is approximately 100 nm, and thus a loss occurs due to mode mismatch in this portion. In addition, it is possible to use an EB process which is able to form the tip end to be narrower, but an increase in manufacturing costs is caused.

On the other hand, J. Zhang, M. Yu, G.-Q. Lo, and D.-L. Kwong, "Silicon-Waveguide-Based Mode Evolution Polarization Rotator," IEEE Journal of Selected Topics in Quantum Electronics, Vol. 16, Issue 1, pp. 53-60 (2010) is exemplified as an example of realizing the same polarization rotation process as that of L. Chen, C. R. Doerr, and Y.-K. Chen, "Compact polarization rotator on silicon for polarization-diversified circuits," Optics letters, Vol. 36, Issue 4, pp. 469-471 (2011) described above by only using silicon. However, as described above, when a tapered tip end portion has a width of approximately 100 nm in a connection portion, a loss due to the mode mismatch occurs.

In Junji YAMAUCHI, Masatoru SHIMADA, Tadashi NAKAMURA, Yuu WAKABAYASHI, and Hisamatsu NAKANO, "Reflection Loss of L-shaped and Inclined Waveguide Type Polarization Converter", Proceedings of The Institute of Electronics, Information and Communication Engineers, 2011, C-3-52, a structure is disclosed in which an L-shaped waveguide is connected to a rectangular waveguide. This is an element in which a waveguide of which a polarization axis is inclined is connected to an original waveguide, and thus the polarization is rotated by using a difference in effective refractive indices between the two modes. However, in this connection portion, a loss occurs, and the effective refractive index depends on the wavelength. Therefore, wavelength dependency occurs.

In addition, in C. Alonso-Ramos, S. Romero-Garcia, A. Ortega-Monux, I. Molina-Fernandez, R. Zhang, H. G. Bach, and M. Schell, "Polarization rotator for InP rib waveguide," Optics Letters, Vol. 37, Issue 3, pp. 335-337 (2012), a method of connecting a waveguide having an inclined axis by similarly deforming a rib type waveguide is disclosed as an example of using InP. A polarization rotation element with a low loss is realized from the rib type waveguide by designing a length suitable for the L-shaped waveguide in which the TE mode and the TM mode are mixed, and by exciting both of the modes with a low loss.

However, problems occur such as a manufacturing tolerance of a taper portion for exciting both of the modes and the occurrence of wavelength dependency as with Junji YAMAUCHI, Masatoru SHIMADA, Tadashi NAKAMURA, Yuu WAKABAYASHI, and Hisamatsu NAKANO, "Reflection Loss of L-shaped and Inclined Waveguide Type Polarization Converter," Proceedings of The Institute of Electronics, Information and Communication Engineers, 2011, C-3-52.

As described above, in the related art, a polarization conversion element in which an easy manufacturing process and low wavelength dependency are compatible is required to be realized.

SUMMARY OF THE INVENTION

The present invention has been made in consideration of the above circumstances, and an object of the present invention is to provide a polarization conversion element which can be easily manufactured.

In order to solve the object described above, according to a first aspect of the present invention, a polarization conversion element is provided that includes an optical waveguide formed on a substrate, the optical waveguide includes sequentially a first waveguide portion, a polarization rotation portion, and a second waveguide portion. In the first waveguide portion, an eigen mode of waveguide light on a sectional surface of the first waveguide portion includes at least one TE mode and one TM mode, and an effective refractive index of the TE mode having the highest effective refractive index is higher than an effective refractive index of the TM mode having the highest effective refractive index, in the second waveguide portion, an eigen mode of waveguide light on a sectional surface of the second waveguide portion includes at least one TE mode and one TM mode, and an effective refractive index of the TM mode having the highest effective refractive index is higher than an effective refractive index of the TE mode having the highest effective refractive index, a height of a waveguide structure of the first waveguide portion and a height of a waveguide structure of the second waveguide portion are equal to each other, a waveguide structure of the polarization rotation portion has at least two heights in a height direction from the substrate, and the waveguide structure includes a thick plate portion having the same height as that of the waveguide structure of the first waveguide portion and the second waveguide portion, and a thin plate portion having a thickness thinner than that of the thick plate portion, the waveguide structure of the polarization rotation portion includes a portion of which a sectional surface is asymmetric in a width direction and is also asymmetric in a height direction, waveguide structures having the same height continuously exist between the waveguide structure of the first waveguide portion, the thick plate portion of the polarization rotation portion, and the waveguide structure of the second waveguide portion, and the waveguide has a length of the longitudinal direction that is capable of performing the mode conversion adiabatically.

According to a second aspect of the present invention, in a polarization conversion element according to the first aspect, it is preferable that a width of the thin plate portion of the polarization rotation portion is continuously changed toward the second waveguide portion.

According to a third aspect of the present invention, in a polarization conversion element according to the first or second aspect, it is preferable that a width of the waveguide structure be continuously changed without having a discontinuous point between the first waveguide portion, the polarization rotation portion, and the second waveguide portion, along a waveguide direction.

According to a forth aspect of the present invention, in a polarization conversion element according to any one of the first to third aspects, it is preferable that the sectional surface of the waveguide structure of the first waveguide portion be in the shape of a rectangle in which the width direction is larger than the height direction.

According to a fifth aspect of the present invention, in a polarization conversion element according to any one of the first to third aspects, it is preferable that the waveguide structure of the first waveguide portion be a rib type structure including a thick rib portion and a thin slab portion.

According to a sixth aspect of the present invention, in a polarization conversion element according to the fifth aspect, it is preferable that a height of the thick plate portion of the polarization rotation portion be equal to a height of the rib portion, and a height of the thin plate portion be equal to a height of the slab portion.

According to a seventh aspect of the present invention, in a polarization conversion element according to any one of the first to sixth aspects, it is preferable that the sectional surface of the waveguide structure of the second waveguide portion be in the shape of a rectangle in which the width direction is smaller than the height direction.

According to an eighth aspect of the present invention, in a polarization conversion element according to any one of the first to seventh aspects, it is preferable that the waveguide structure of the second waveguide portion continuously include a portion of which a sectional surface linearly extending with a constant width is in the shape of a rectangle in the thick plate portion.

According to a ninth aspect of the present invention, in a polarization conversion element according to any one of the first to sixth aspects, it is preferable that the waveguide structure of the second waveguide portion be a rib type structure including a thick rib portion and a thin slab portion.

According to a tenth aspect of the present invention, in a polarization conversion element according to any one of the first to ninth aspects, it is preferable that the eigen mode of the waveguide light on the sectional surface of the first waveguide portion include one TE mode and one TM mode, or include at least two TE modes and one TM mode having an effective refractive index higher than that of the TE mode having the second highest effective refractive index.

According to a eleventh aspect of the present invention, in a polarization conversion element according to any one of the first to tenth aspects, it is preferable that the second waveguide portion be connected to a mode expansion portion in which a width of a waveguide structure expands along a direction away from the polarization rotation portion.

According to a twelfth aspect of the present invention, in a polarization conversion element according to any one of the first to tenth aspects, it is preferable that any one or both of the first waveguide portion and the second waveguide portion be connected to a tapered mode conversion unit in which a width of a waveguide structure becomes narrower along a direction away from the polarization rotation portion.

According to a thirteenth aspect of the present invention, in a polarization conversion element according to any one of the first to twelfth aspects, it is preferable that a lower surface of the thick plate portion and a lower surface of the thin plate portion of the polarization rotation portion have the same height from the substrate.

According to a fourteenth aspect of the present invention, in a polarization conversion element according to any one of the first to twelfth aspects, it is preferable that an upper surface of the thick plate portion and an upper surface of the thin plate portion of the polarization rotation portion have the same height from the substrate.

According to a fifteenth aspect of the present invention, in a polarization conversion element according to any one of the first to fourteenth aspects, it is preferable that the waveguide structure be a core.

According to a sixteenth aspect of the present invention, in a polarization conversion element according to any one of the first to fourteenth aspects, it is preferable that the waveguide structure be formed of a core and an upper cladding which is laminated on the core and has a width of less than or equal to a width of the core.

According to a seventeenth aspect of the present invention, a DP-QPSK modulator is provided that includes the polarization conversion element according to any one of the first to sixteenth aspects.

According to the aspects of the present invention, a waveguide structure such as a core is a structure which can be easily manufactured without including a tapered portion having a narrow tip end portion.

BRIEF DESCRIPTION OF THE DRAWINGS

FIG. 7 view (a) is a perspective view showing an example of a third embodiment of the polarization conversion element of the present invention, and FIG. 7 view (b) is a sectional view of a boundary portion between L1 and L2.

DETAILED DESCRIPTION OF THE PREFERRED EMBODIMENTS

Hereinafter, the present invention will be described on the basis of suitable embodiments with reference to the drawings.

Figure 1:
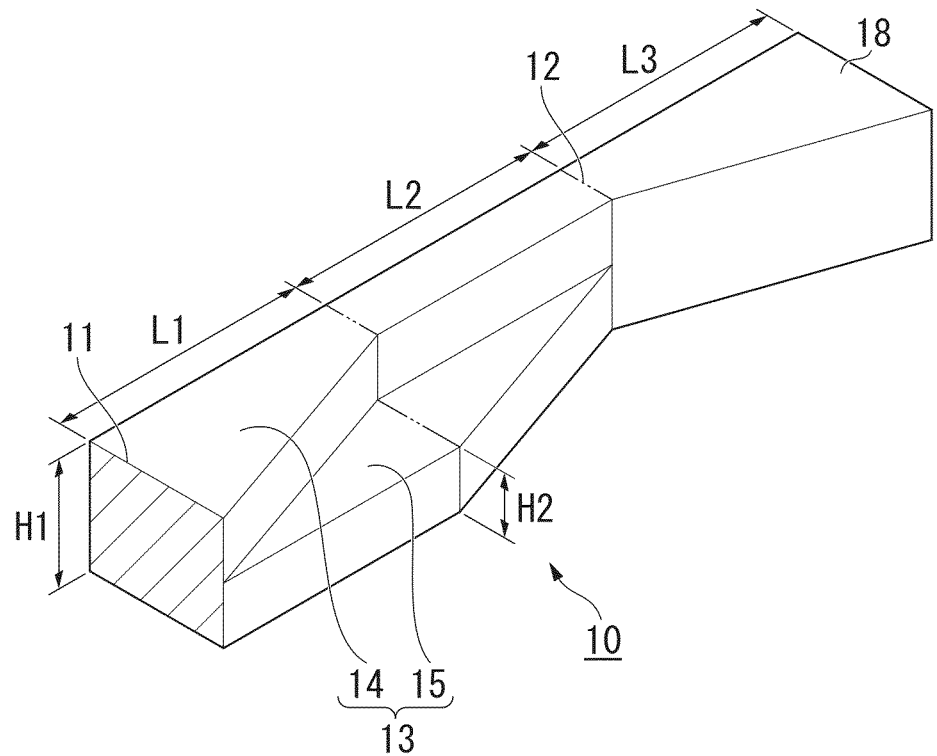
FIG. 1 is a perspective view showing an example of a first embodiment of a polarization conversion element of the present invention.
Figure 2:
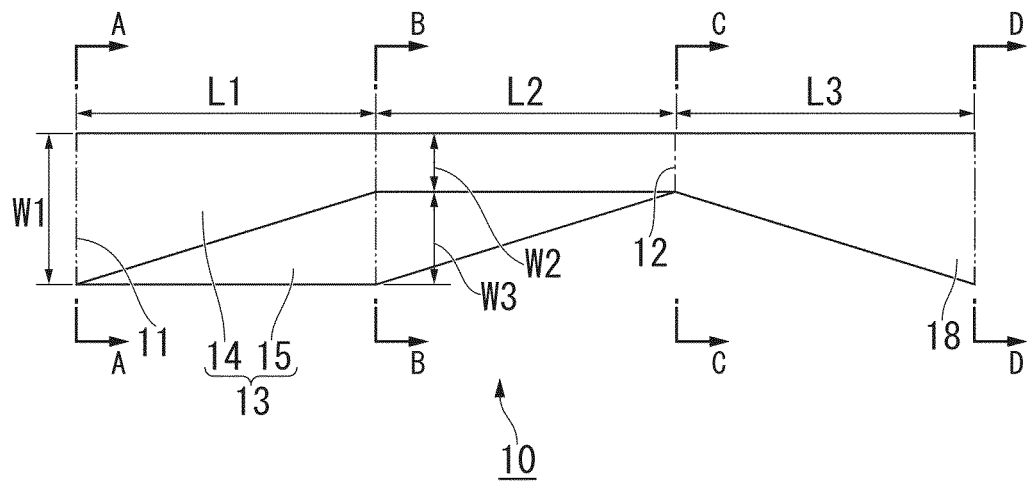
FIG. 2 is a top view of the polarization conversion element of FIG. 1.
Figure 3:
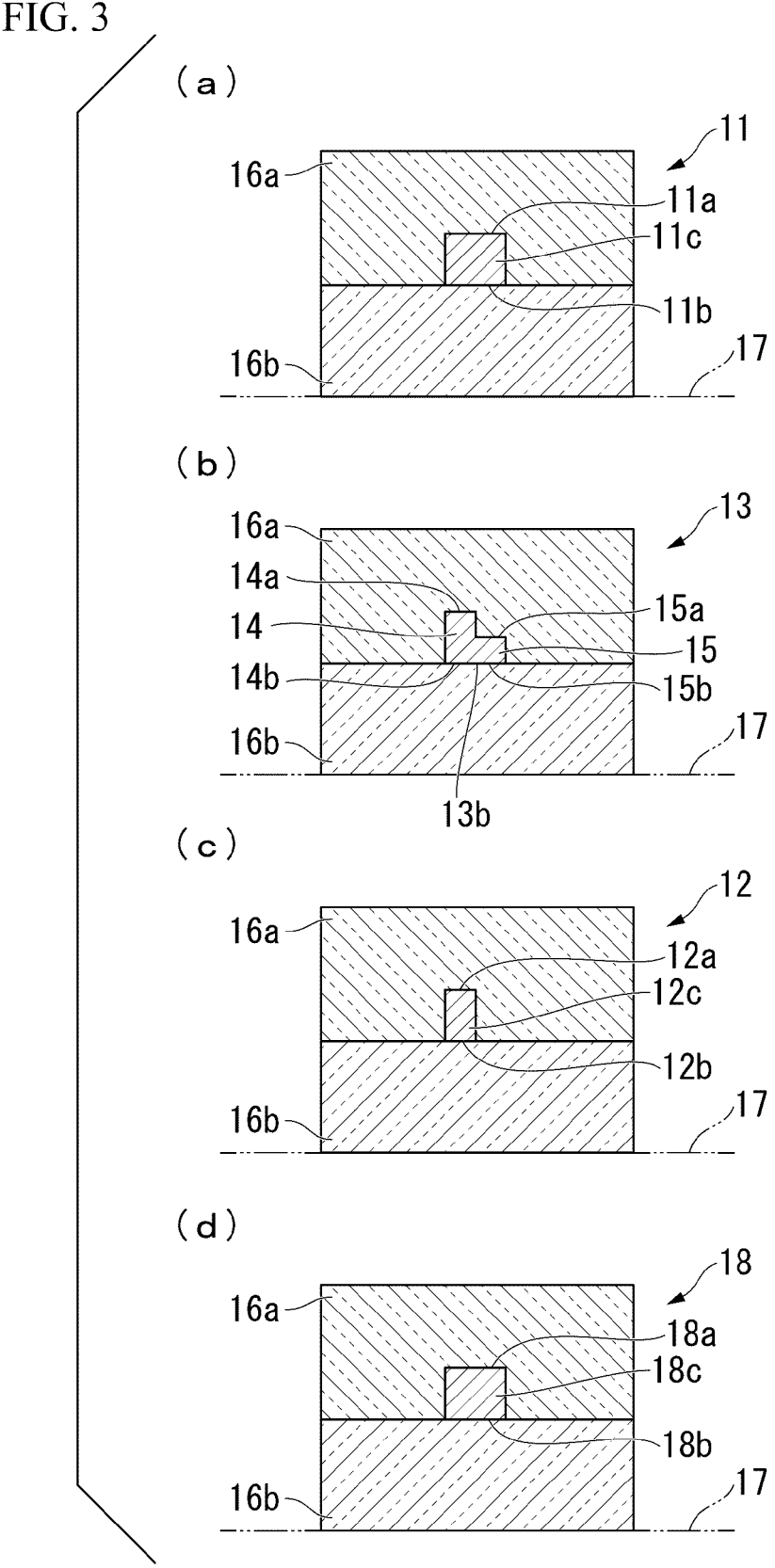
FIG. 3 view (a) is a sectional view cut along line A-A of FIG. 2, FIG. 3 view (b) is a sectional view cut along line B-B of FIG. 2, FIG. 3 view (c) is a sectional view cut along line C-C of FIG. 2, and FIG. 3 view (d) is a sectional view cut along line D-D of FIG. 2.

In FIGS. 1 to 3, an example of a first embodiment of a polarization conversion element of the present invention is shown. FIG. 1 is a perspective view of a core, FIG. 2 is a top view of the core, and FIG. 3 views (a) to (d) are respectively sectional views of an optical waveguide including a cladding cut along line A-A, line B-B, line C-C, and line D-D of FIG. 2. For the sake of convenience, each of sectional surfaces of FIG. 3 views (a) to (d) according to A to D of FIG. 2 is referred to as a sectional surface A, a sectional surface B, a sectional surface C, and a sectional surface D. In FIG. 1 and FIG. 2, the clad is not shown. The sectional view indicates a sectional surface on a surface which is vertical to a waveguide direction.

A polarization conversion element 10 is formed of an optical waveguide formed on a substrate 17 (refer to FIG. 3). As shown in FIG. 3 views (a) to (c), the optical waveguide includes a lower cladding 16b formed on the substrate 17, cores 11c and 12c formed on the lower cladding 16b, and an upper cladding 16a formed on the lower cladding 16b and the core. The core, for example, is formed of silicon (Si), and the cladding (the upper cladding 16a and the lower cladding 16b), for example, is formed of silica ($SiO_2$). In FIG. 3, a part of the optical waveguide in a width direction is shown, and the cladding may further expand in a horizontal direction.

An optical waveguide structure of the polarization conversion element 10 shown in FIG. 1 is mainly divided into three portions. These three portions are sequentially a first waveguide portion 11 shown in FIG. 3 view (a), a polarization rotation portion 13 shown in FIG. 3 view (b), and a second waveguide portion 12 shown in FIG. 3 view (c). The waveguide direction is a direction directed towards the second waveguide portion 12 from the first waveguide portion 11 through the polarization rotation portion 13 or a direction directed towards the first waveguide portion 11 from the second waveguide portion 12 through the polarization rotation portion 13.

An eigen mode of waveguide light on the sectional surface of the first waveguide portion 11 includes at least one TE mode and one TM mode. The core 11c of the first waveguide portion 11 has a structure in which at least two modes of the TE mode and the TM mode exist in the decreasing order of an effective refractive index among the waveguide modes. That is, when a width W1 increases to a certain degree, a higher order mode of TE occurs, but there is no problem insofar as the effective refractive index of this higher order mode is lower than the effective refractive index of a fundamental TM mode. For this reason, it is preferable that the width W1 of the core 11c (refer to FIG. 2) be greater than a height H1 (refer to FIG. 1).

When the eigen mode of the waveguide light on the sectional surface of the first waveguide portion 11 includes one TE mode and one TM mode, the effective refractive index of the TE mode may be higher than the effective refractive index of the TM mode.

When the eigen mode of the waveguide light on the sectional surface of the first waveguide portion 11 includes at least two TE modes and one TM mode, the effective refractive index of the TE mode having the highest effective refractive index is higher than the effective refractive index of the TM mode, and the effective refractive index of the TM mode may be higher than the effective refractive index of the TE mode having the second highest effective refractive index.

In FIG. 1 or FIG. 3 view (a), the first waveguide portion 11 is formed of a rectangular waveguide in which the sectional surface of the core 11c is in the shape of a rectangle, but is not limited thereto. The first waveguide portion can be configured of a rectangular waveguide, a rib type waveguide, a linear waveguide, a bending waveguide, and a various waveguide having a desired shape, and for example, can be configured by combining two or more types of waveguides such as using the rectangular waveguide and the rib type waveguide in different sections in a longitudinal direction. In a portion in which the first waveguide portion is formed of the rectangular waveguide, it is preferable that the width of the core be larger than the height of the core.

An eigen mode of waveguide light on the sectional surface of the second waveguide portion 12 includes at least one TE mode and one TM mode. The core 12c of the second waveguide portion 12 has a structure in which at least two modes of the TE mode and the TM mode exist in the decreasing order of an effective refractive index among the waveguide modes. For this reason, it is preferable that a width W2 of the core 12c (refer to FIG. 2) be smaller than a height H1 (refer to FIG. 1).

When the eigen mode of the waveguide light on the sectional surface of the second waveguide portion 12 includes one TE mode and one TM mode, the effective refractive index of the TM mode may be higher than the effective refractive index of the mode.

When the eigen mode of the waveguide light on the sectional surface of the second waveguide portion 12 includes at least two TE modes and one TM mode, the effective refractive index of the TM mode may be higher than the effective refractive index of the TE mode having the highest effective refractive index.

In FIG. 3 view (c), the second waveguide portion 12 is formed of a rectangular waveguide in which the sectional surface of the core 12c is in the shape of a rectangle, but is not limited thereto. The second waveguide portion can be configured of a rectangular waveguide, a rib type waveguide, a linear waveguide, a bending waveguide, and various waveguides having a desired shape, and for example, can be configured by combining two or more types of waveguides such as using the rectangular waveguide and the rib type waveguide in different sections in a longitudinal direction. In a portion in which the second waveguide portion is formed of the rectangular waveguide, it is preferable that the width of the core be less than the height of the core.

In the polarization rotation portion 13, the core has at least two heights from the substrate 17 in a height direction as shown in FIG. 3 view (b), and has a step-like configuration among the waveguide structures. The core of the polarization rotation portion 13 includes a thick plate portion 14, and a thin plate portion 15 having a thickness thinner than that of the thick plate portion 14. As shown in FIG. 1 and FIG. 3 views (a) to (c), the core 11c of the first waveguide portion 11 and the core 12c of the second waveguide portion 12 have the same height H1, and the height H1 of the thick plate portion 14 is equal to the height H1 of the cores 11c and 12c. As shown in FIG. 2, the thin plate portion 15 is on one side of the thick plate portion 14, and the core sectional surface of the sectional surface B (refer to FIG. 3 view (b)) is asymmetric in the width direction. A height H2 of the thin plate portion 15 is lower than the height H1 of the thick plate portion 14. Further, the thin plate portion 15 exists in a lower portion of the thick plate portion 14, and thus the core sectional surface of the sectional surface B is asymmetric in the height direction.

The sectional structure of the core is continuously changed between the first waveguide portion 11 and the second waveguide portion 12. The width of the core does not have a discontinuous point along the waveguide direction, and each of the widths of the thick plate portion 14 and the thin plate portion 15 is continuously changed. In the present embodiment, as shown in FIG. 1 and FIG. 2, the width of the thick plate portion 14 is continuously changed in a section L1, and the width of the thin plate portion 15 is continuously changed in a section L2. A width W1 of the entire core including the thick plate portion 14 and the thin plate portion 15 is constant in the section L1, and a width W2 of the thick plate portion 14 is constant in the section L2. A width W3 of the thin plate portion 15 on the sectional surface B is equal to a difference of W1−W2.

The core continuously exists with the same height between the core 11c of the first waveguide portion 11 and the core 12c of the thick plate portion 14 and the second waveguide portion 12 of the polarization rotation portion 13. That is, upper surfaces 11a and 12a of the cores 11c and 12c are flush with an upper surface 14a of the thick plate portion 14, and lower surfaces 11b and 12b of the cores 11c and 12c are flush with a lower surface 14b of the thick plate portion 14.

In the polarization conversion element 10 of the present embodiment, only the width of the core is continuously changed in a section L3 of FIG. 1. That is, the second waveguide portion 12 is connected to a mode expansion portion 18 in which the width of a core 18c expands along a direction away from the polarization rotation portion 13. The structure of the sectional surface D shown in FIG. 3 view (d) can be in the same shape as that of the sectional surface A of FIG. 3 view (a). The sectional surface of the core 18c is in the shape of a rectangle. In the mode expansion portion 18, the height of the core 18c is constant as H1, and the upper surface 18a and the lower surface 18b of the core 18c are respectively flush with the upper surface 12a and the lower surface 12b of the core 12c of the second waveguide portion 12.

In the polarization conversion element 10 of the present embodiment, according to the structure described above, the polarization can be rotated, that is, the TE mode and the TM mode can be replaced with each other only by changing the shape of the core. The principle will be described as follows.

First, as described above, in the sectional surface A of the first waveguide portion 11, the TE mode and the TM mode are aligned in the decreasing order of the effective refractive index. In this state, a main electric field of each of the modes exists in a vertical direction and a horizontal direction at a high ratio (for example, refer to FIG. 20 of Example 1). As described above, the main electric field of the TE mode is the vertical direction, and the main electric field of the TM mode is the horizontal direction. On the other hand, two modes on the sectional surface B of the polarization rotation portion 13 are modes in which a TE component and a TM component are mixed (for example, refer to FIG. 21 of Example 1).

Figure 22:
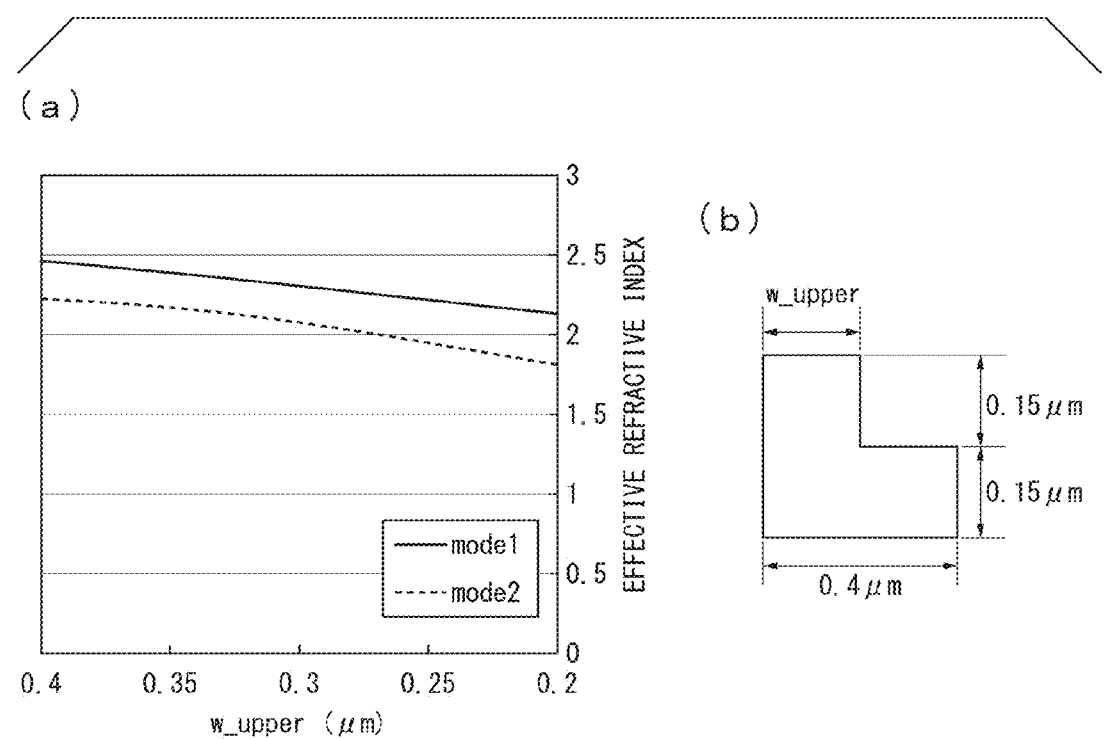
FIG. 22 graph (a) is a graph showing a change in an effective refractive index from the sectional surface A to the sectional surface B in Example 1, and FIG. 22 diagram (b) is a diagram showing a sectional structure thereof.

The effective refractive indices of the respective modes at the time of changing the structure from the sectional surface A to the sectional surface B, for example, as shown in FIG. 22 graph (a) of Example 1, do not intersect with each other, but are away from each other. Accordingly, when the change is sufficiently gradually performed (an adiabatic change), a mode (the TE mode) having the highest effective refractive index on the sectional surface A is combined into a mode having the highest effective refractive index on the sectional surface B, and a mode having the second highest effective refractive index on the sectional surface A is combined into a mode having the second highest effective refractive index on the sectional surface B.

Figure 23:
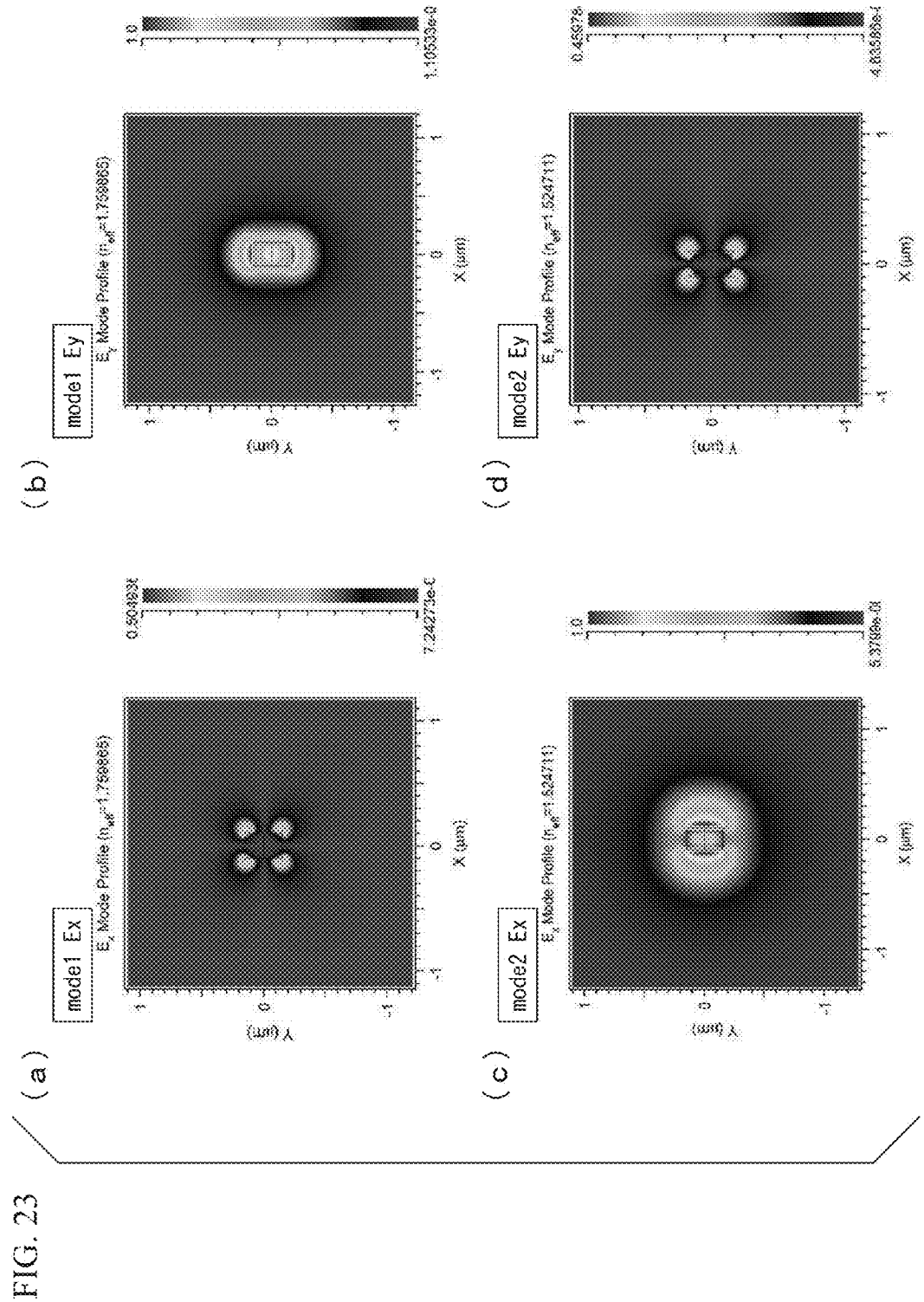
FIG. 23 diagram (a) to (d) are diagrams showing an electric field distribution of a sectional surface C in Example 1.
Figure 24:
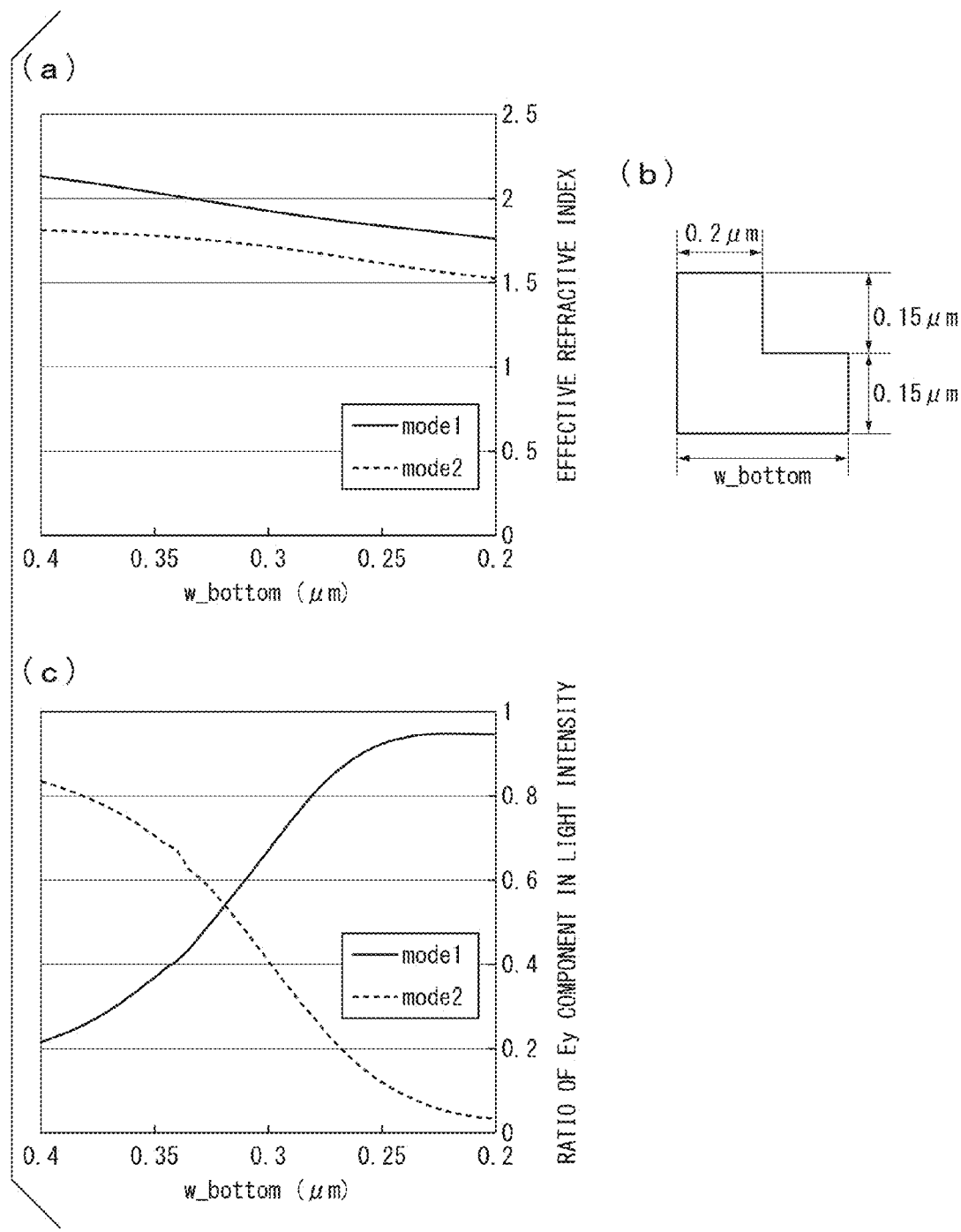
FIG. 24 graph (a) is a graph showing a change in an effective refractive index from the sectional surface B to the sectional surface C in Example 1, FIG. 24 diagram (b) is a diagram showing a sectional structure thereof, and FIG. 24 graph (c) is a graph showing a contribution ratio of an Ey component in light intensity of each mode at the time of changing the structure from the sectional surface B to the sectional surface C in Example 1.

Next, in the sectional surface C of the second waveguide portion 12, a mode having the highest effective refractive index is the TM mode, and a mode having the second highest effective refractive index is the TE mode (for example, refer to FIG. 23 of Example 1). However, in a change in the effective refractive index in the process of transition from the sectional surface B to the sectional surface C, as shown in FIG. 24 graph (a) of Example 1, the effective refractive indices do not intersect with each other, but are away from each other. Therefore, the mode having the highest effective refractive index on the sectional surface B is combined into the mode having the highest effective refractive index on the sectional surface C (the TM mode), and the mode having the second highest effective refractive index on the sectional surface B is combined into the mode having the second highest effective refractive index on the sectional surface C.

For this reason, when light propagates from the sectional surface A to the sectional surface C, the TE mode on the sectional surface A is converted into the TM mode on the sectional surface C. That is, the polarization rotation portion 13 functions as a polarization rotator (a polarization rotation element).

In FIG. 24 graph (c), a contribution ratio $C_y$ of the Ey component in light intensity of each of the modes at the time of changing the structure from the sectional surface B to the sectional surface C is shown. $C_y$ is defined in the following expression.

$$C_y = \frac{\varepsilon_0 v_c}{4} \int^\infty n(s) E_y^2(s) ds \bigg/ \int^\infty P_z(s) ds \quad \text{(Expression 1)}$$

Here, $\varepsilon_0$ represents a dielectric constant, $v_c$ represents a propagation speed of light in vacuum, n represents a relative refractive index, s represents a variable indicating each point which is an integration range on the sectional surface (to infinity), $E_y$ represents an Ey component, and $P_z$ represents a pointing vector. That is, in the TE mode, an Ex mode is generally a main electric field, and light intensity has a high contribution ratio of an Ex component. That is, in the TM mode in which the contribution ratio of the Ey component becomes lower, the contribution of the Ey component is dominant. It is found that the main component of the electric field is replaced in the process of transition from the sectional surface B to the sectional surface C, and in the sectional surface C, the first mode is the TM mode, and the second mode is the TE mode.

In the mode expansion portion 18, the width of the rectangular waveguide is widened, and the mode expansion portion 18 has a structure in which the height is greater than the width in the sectional surface C of FIG. 3 view (c) and a structure in which the height is less than the width in the sectional surface D of FIG. 3 view (d). In this case, in a change in the effective refractive index, the height and the width of the core are equal to each other, and the effective refractive indices of the TE mode and the TM mode are coincident with each other in a position in which a structure is vertically and horizontally symmetric (for example, refer to FIG. 25 of Example 1).

In the mode expansion portion 18, in the entire vertical surface with respect to a propagation direction of light in the mode expansion portion, the TE mode and the TM mode respective have different symmetry. That is, in the vertical surface, the Ex component of the TE mode is symmetric in an x axis direction, and the Ex component of the TM mode is asymmetric in the x axis direction. The rotation of the polarization in the waveguide can be explained by binding the modes, and the combination of both of the modes does not occur due to the opposite symmetry of both of the modes. In the actual manufacturing, the symmetry is likely to collapse due to a variation in the manufacturing, the combination between the modes is weak by only a slight shift, and an adiabatic change does not occur in a range of several tens of μm. For this reason, even when a curve of the change in the effective refractive index between the TE mode and the TM mode intersects towards the sectional surface D from the sectional surface C, the respective modes do not intersect with each other, and the TE mode is transitioned to the TE mode and the TM mode is transitioned to the TM mode. Accordingly, in the mode expansion portion 18, the sequence of the effective refractive index in each propagation mode is replaced between the TE mode and the TM mode.

As described above, in the waveguide in the sections L1 and L2 including the polarization rotation portion 13, the sectional structure is vertically and horizontally (in the height direction and the width direction) asymmetric, and thus a change from the TE mode to the TM mode is induced. In principle, when slight asymmetry occurs, the length of the waveguide is sufficiently obtained, and adiabatic conversion can be performed, but practically, it is necessary that the conversion be performed with a limited length. Therefore, in the present embodiment, asymmetry is induced due to the step-like polarization rotation portion 13 such that obvious separation occurs due to an effective refractive index.

In the polarization rotation element of the present structure, in consideration of asymmetry between a zero-order mode of TE (a mode having the highest effective refractive index) and a zero-order mode of TM, the conversion is performed between both of the modes, and as described below, the conversion can be performed between a $TE_{2n}$ mode (n is an integer of greater than or equal to 0) and the zero-order mode of TM.

When the present structure is applied to a silicon waveguide, a silicon-on-insulator (SOI) substrate formed of Si—SiO$_2$—Si can be formed as a substrate used for manufacturing the waveguide. An intermediate SiO$_2$ layer is used as the lower cladding, and an upper Si layer is used as the core. The Si layer is in the shape of a step having a different height, and the Si layer can be formed by performing etching in the middle of a depth direction. The upper cladding in the upper portion of the silicon core is deposited after the silicon core is formed.

Figure 4:
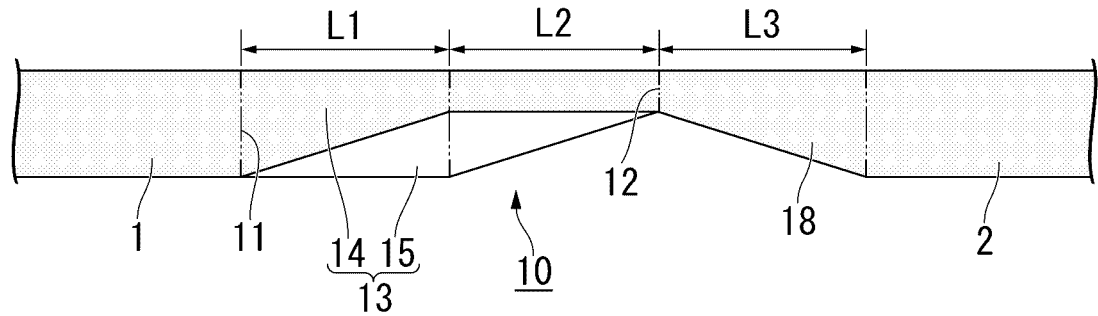
FIG. 4 is a top view of a configuration in which a front portion and a back portion of the polarization conversion element of FIG. 1 are connected to a rectangular waveguide.

When the polarization conversion element 10 of the present embodiment is incorporated in the waveguide, as shown in FIG. 4, each of waveguides 1 and 2 can be connected to each of the first waveguide portion 11 and the second waveguide portion 12. When the waveguides 1 and 2 have an arbitrary shape, the waveguides 1 and 2 may be a rectangular waveguide in which the width and the height of the core are constant.

Figure 5:
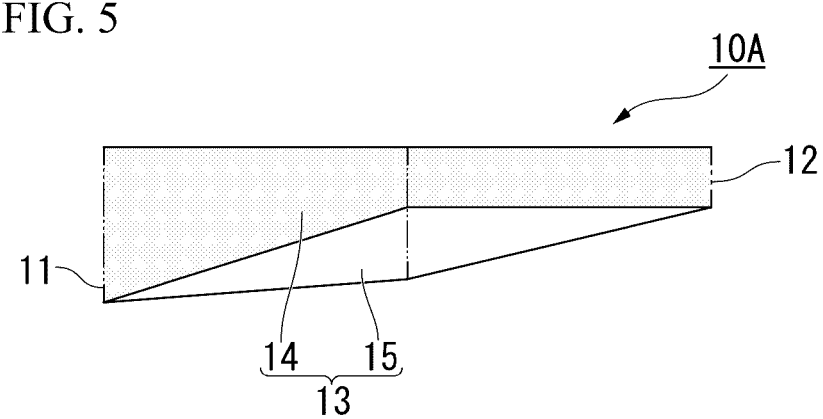
FIG. 5 is a top view showing an example of a second embodiment of the polarization conversion element of the present invention.
Figure 6:
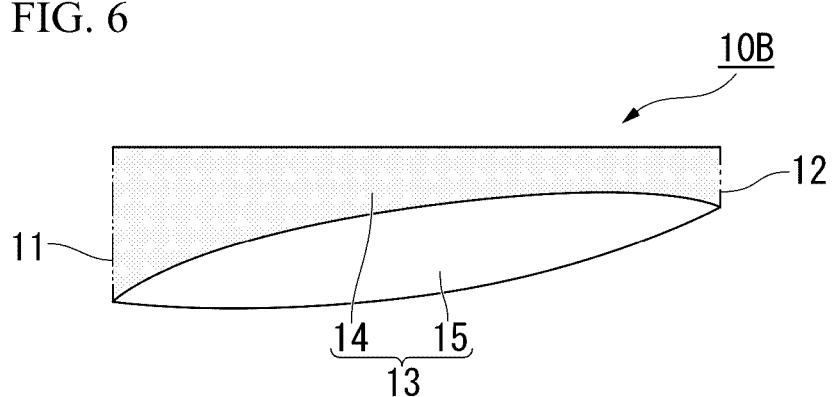
FIG. 6 is a top view showing another example of the second embodiment of the polarization conversion element of the present invention.

In FIG. 5 and FIG. 6, each example of a second embodiment of the polarization conversion element of the present invention is shown.

In the polarization conversion element 10 of the first embodiment shown in FIGS. 1 to 4, asymmetry vertically occurs by dividing the height of the core into two steps between the sectional surface A and the sectional surface C, and asymmetry horizontally occurs by arranging the thin plate portion 15 in the lower step on one side of the thick plate portion 14. Therefore, polarization conversion is performed. At this time, in the first embodiment, for the sake of convenience, the section L1 and the section L2 are divided on the basis of the sectional surface B as a boundary, the width of the upper step of the step-like core (the width of the thick plate portion 14) and the width of the lower step of the step-like core (the entire width of the thick plate portion 14 and the thin plate portion 15) are independently changed.

However, independently changing the width of the upper step and the lower step of the step is not essential, and for example, the widths of the upper step and the lower step can be concurrently changed along the waveguide direction as in a polarization conversion element 10A of FIG. 5. Further, it is not necessary that the core side surface be in the shape of a straight line, and the core side surface may be in the shape of a curve as in a polarization conversion element 10B of FIG. 6. Thus, a section in which the core width of the upper step is changed and a section in which the core width of the lower step is changed are superposed in a part or all of the waveguide direction of the polarization conversion element, and thus further shortening in the waveguide and improvement in a polarization extinction ratio can be obtained.

In FIG. 7, an example of a third embodiment of the polarization conversion element of the present invention is shown. In the first embodiment and the second embodiment, the width of the lower step of the core is wider than the width of the upper step of the core. This is effective when the core is formed by performing etching with respect to a rectangular waveguide. In FIG. 3 view (b), the lower surface 14b of the thick plate portion 14 and the lower surface 15b of the thin plate portion 15 have the same height from the substrate 17, and are flush with a lower surface 13b of the polarization rotation portion 13.

On the other hand, as shown in FIG. 7, the core can also be formed such that the width of the upper step of the core is greater than the width of the lower step of the core. For example, in a silicon waveguide, silicon is accumulated by using polysilicon, and it is possible to form a waveguide in which the width of an upper portion is wide. In FIG. 7 view (b), the upper surface 14a of the thick plate portion 14 and the upper surface 15a of the thin plate portion 15 have the same height from the substrate 17, and are flush with the upper surface 13a of the polarization rotation portion 13.

In FIG. 7 view (a), as with the first embodiment of FIG. 1 and FIG. 2, the mode expansion portion 18 is disposed in the section L3, but it is sufficient that the sections L1 and L2 are provided in order to obtain the polarization conversion element. As shown in FIG. 4, the waveguides 1 and 2 may be disposed on the front and back of the polarization conversion element. In addition, in the polarization conversion element of FIG. 7 view (a), the section L1 in which the width of the lower step of the core is changed and the section L2 in which the width of the upper step of the core is changed are divided along the waveguide direction, and as with the second embodiment, it is possible to concurrently change the upper step and the lower step.

Figure 8:
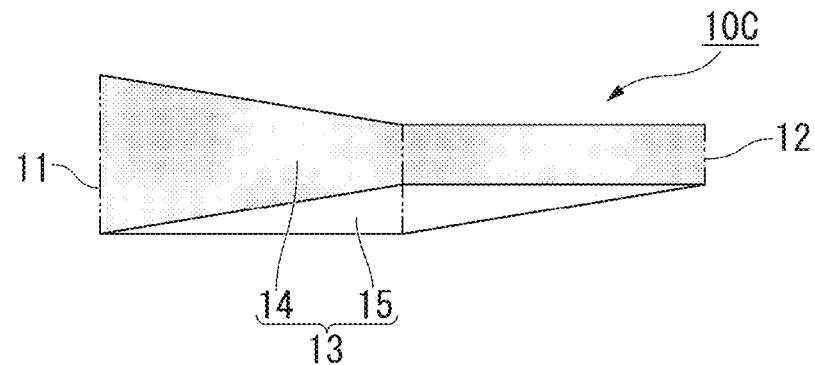
FIG. 8 is a top view showing an example of a fourth embodiment of the polarization conversion element of the present invention.

In FIG. 8, an example of a fourth embodiment of the polarization conversion element of the present invention is shown.

In the first embodiment to the third embodiment, a change in the center position of the core width along an advancing direction (the waveguide direction) is not particularly described, and in the drawings, a side portion in which the thin plate portion 15 of the thick plate portion 14 is not disposed is linear. The present invention is not particularly limited thereto, and for example, the center position of the core width is shifted as shown in a polarization conversion element 10C of FIG. 8.

Figure 9:
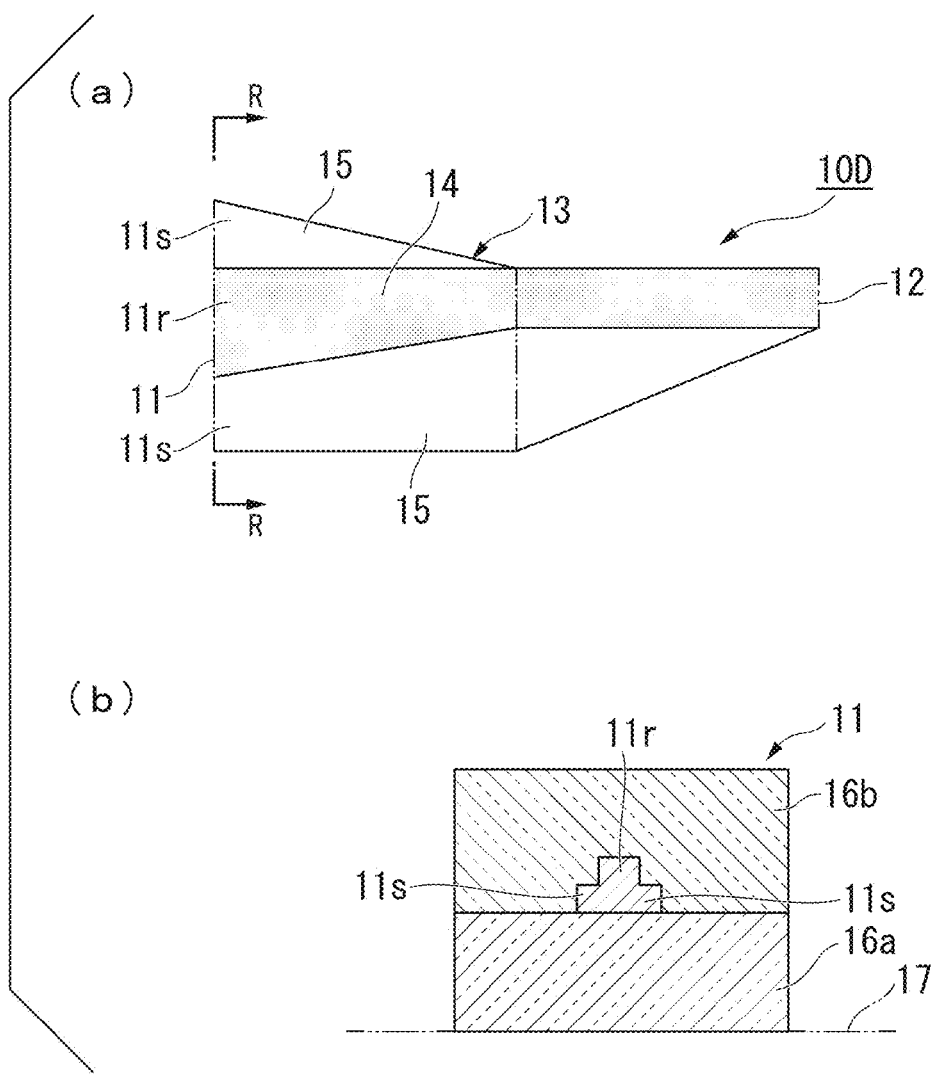
FIG. 9 view (a) is a top view showing an example of a fifth embodiment of the polarization conversion element of the present invention, and FIG. 9 view (b) is a sectional view cut along line R-R.

In FIG. 9 views (a) and (b), an example of a fifth embodiment of the polarization conversion element of the present invention is shown.

In the first embodiment (FIGS. 1 to 4), the first waveguide portion 11 and the waveguide 1 are rectangular waveguides, but are not limited thereto, and the shape of the core sectional surface may be continuously changed from a rib type shape. According to this configuration, it is possible to concurrently perform polarization rotation with conversion from a rib type optical waveguide to a rectangular waveguide. In addition, as shown in FIG. 9, it is not necessary that the thin plate portion 15 be positioned only on one side with respect to the thick plate portion 14, and the thin plate portion 15 may exist at a position opposite to the position of the waveguide insofar as asymmetry remains in the width direction. In a polarization conversion element 10D, the core of the first waveguide portion 11 has a rib type structure including a thick rib portion 11r and thin slab portions 11s and 11s. In this case, it is preferable that the height of the thick plate portion 14 of the polarization rotation portion 13 be equal to the height of the rib portion 11r, and the height of the thin plate portion 15 be equal to the height of the slab portion 11s. In the rib type optical waveguide connected to the first waveguide portion 11, the widths of each of the slab portions 11s and 11s on both sides of the rib portion 11r may be equal to each other.

The present structure is a mode evolution type polarization rotator, and even when a manufacturing error occurs due to a mask shift or the like, property deterioration is low. In FIG. 9, the core of the first waveguide portion 11 has the rib type structure including the thick rib portion and the thin slab portion, and the core of the second waveguide portion may have the rib type structure including the thick rib portion and the thin slab portion.

The rib type waveguide is also versatilely used in an optical waveguide device using an InP-based material as disclosed in C. Alonso-Ramos, S. Romero-Garcia, A. Ortega-Monux, I. Molina-Fernandez, R. Zhang, H. G. Bach, and M. Schell, "Polarization rotator for InP rib waveguide," Optics Letters, Vol. 37, Issue 3, pp. 335-337 (2012). This conversion element can be applied not only to the silicon waveguide but also to a waveguide having a high refractive index difference using other materials such as InP or GaAs (for example, refer to a tenth embodiment and an eleventh embodiment described below).

Figure 10:
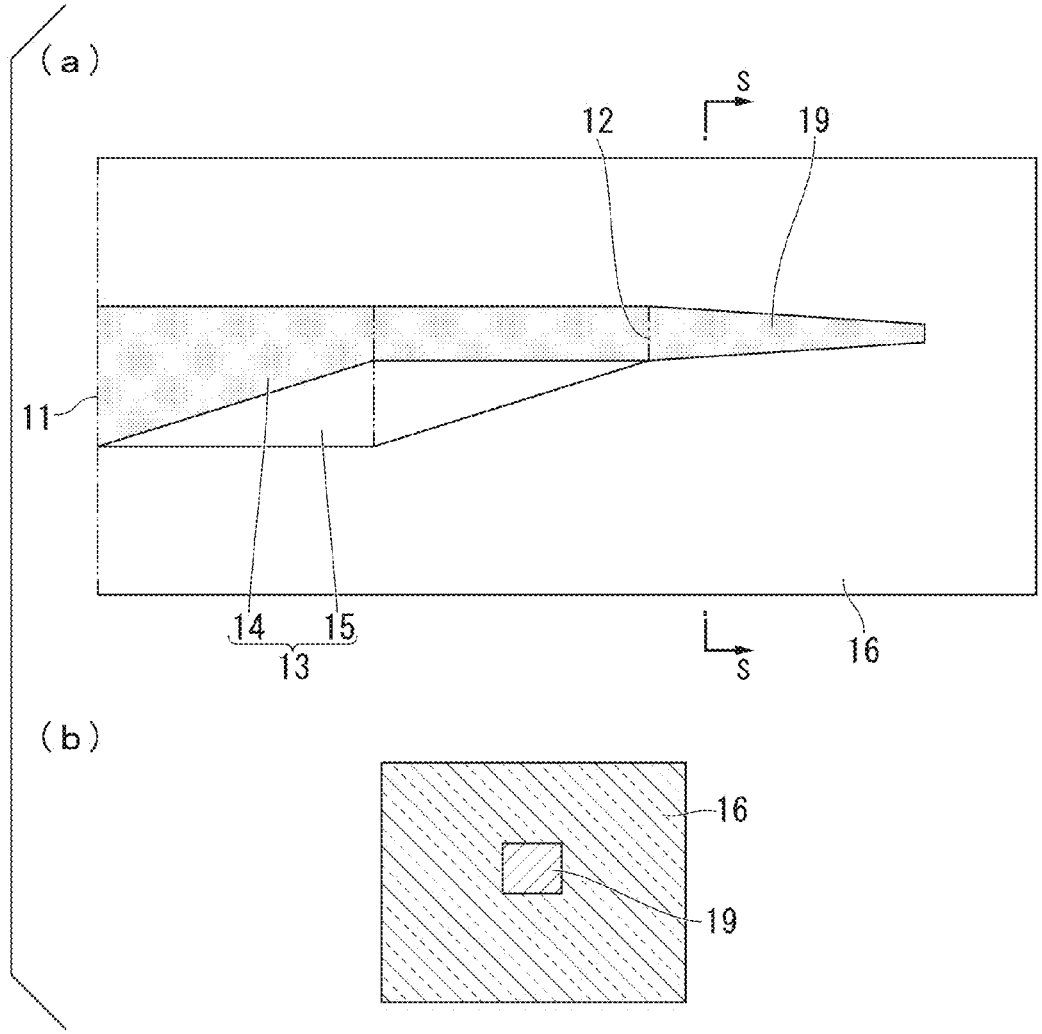
FIG. 10 view (a) is a top view showing an example of a sixth embodiment of the polarization conversion element of the present invention, and FIG. 10 view (b) is a sectional view cut along line S-S.

In FIG. 10, an example of a sixth embodiment of the polarization conversion element of the present invention is shown.

In the first embodiment (FIG. 4), the width of the waveguide is widened again from the second waveguide portion 12 to the mode expansion portion 18, and thus is connected to the original rectangular waveguide 2 (having the same sectional structure as that of the rectangular waveguide 1 on the opposite side), but this connection with respect to the rectangular waveguide 2 is not essential.

As shown in FIG. 10 view (a), a mode conversion unit 19 having a tapered shape in which the width becomes narrower is further disposed in front of the second waveguide portion 12 of the polarization rotator, and thus it is possible to concurrently perform the polarization rotation and the mode conversion. The mode conversion unit 19 has a tapered shape along the waveguide direction in which the width of the core becomes narrower along a direction away from the polarization rotation portion 13. In FIG. 10 view (a), the mode conversion unit 19 is connected to the second waveguide portion 12, and the mode conversion unit 19 may be connected to the first waveguide portion 11, or the mode conversion unit 19 may be connected to both of the first waveguide portion 11 and the second waveguide portion 12. As shown in FIG. 10 view (b), a cladding 16 is disposed around the mode conversion unit 19.

For example, in L. Chen, C. R. Doerr, and Y.-K. Chen, "Compact polarization rotator on silicon for polarization-diversified circuits," Optics letters, Vol. 36, Issue 4, pp. 469-471 (2011), a silicon waveguide is connected to a SiOx waveguide having a low effective refractive index of the core, and the connection with respect to the SiOx waveguide can be performed by surrounding the silicon waveguide with SiOx. In addition, the waveguide having a tapered shape is versatilely used as a mode field converter. The polarization conversion element of the present invention can be used by being combined with the conversion unit with respect to each of the waveguides.

Figure 11:
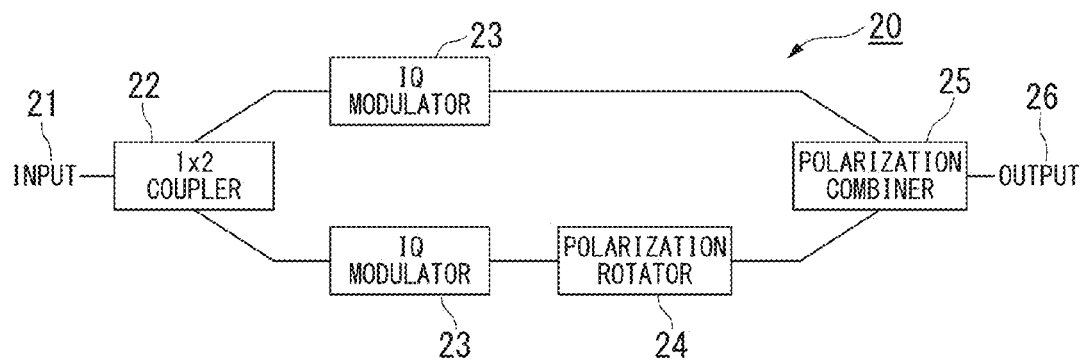
FIG. 11 is a top view showing an example of a seventh embodiment of the polarization conversion element of the present invention.

In FIG. 11, an example of a seventh embodiment of the polarization conversion element of the present invention is shown.

A configuration example used as a modulator corresponding to polarization multiplex represented by a Dual Polarization-Quadrature Phase Shift Keying (DP-QPSK) modulation system which is currently used is shown in FIG. 11. The DP-QPSK modulator 20 branches a TE mode signal input from an input unit 21 into two signals by using an 1×2 coupler 22, and modulates each of the signals by using an IQ modulator 23. One of the two branched TE mode signals is converted into a TM mode signal by a polarization rotator 24. The TE mode signal and the TM mode signal are combined on the same waveguide by a polarization combiner 25, and are output from an output unit 26.

The polarization conversion element of the present invention is used as the polarization rotator 24, and thus it is possible to configure an optical modulator corresponding to a polarization multiplex system on the same substrate. In particular, according to the present structure, it is possible to integrate the polarization rotator with a substrate type optical modulator having a rib type shape without using an additional process.

Figure 12:
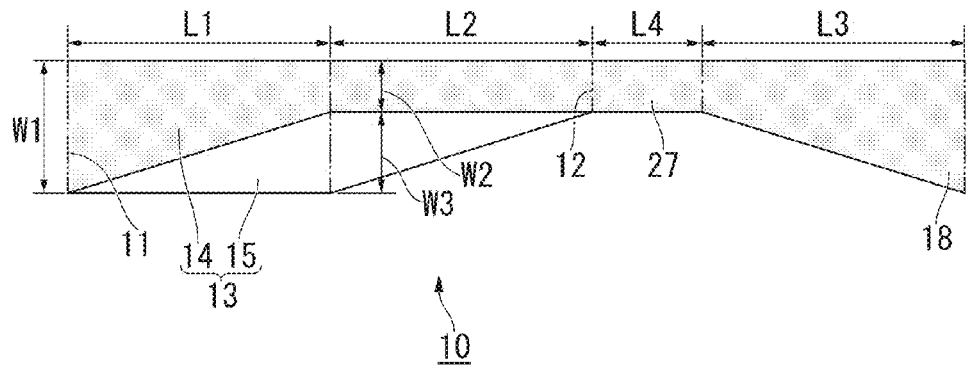
FIG. 12 is a top view showing an example of an eighth embodiment of the polarization conversion element of the present invention.

In FIG. 12, an example of an eighth embodiment of the polarization conversion element of the present invention is shown.

The present embodiment is an example of a structure in consideration of a mask shift at the time of manufacturing. In the present embodiment, as shown in FIG. 3 view (c), the second waveguide portion 12 includes a rectangular waveguide 27 which linearly extends with a constant core width between the polarization rotation portion 13 and the mode expansion portion 18. The rectangular waveguide 27 is continuous to the thick plate portion 14 of the polarization rotation portion 13 in the longitudinal direction of the waveguide. That is, in the present structure, a linear waveguide in which the width of the core (the waveguide structure) is constant is connected to a portion in which the width of the thin plate portion 15 is 0 in the tip end of the polarization rotation portion 13 as the rectangular waveguide 27 in which the height is equal to that of the thick plate portion 14, and the sectional surface of the core (the waveguide structure) is in the shape of a rectangle. The rectangular waveguide 27 may be disposed in the entire second waveguide portion 12, or may be disposed in a part of the second waveguide portion 12.

In general, a silicon rib type waveguide is formed through two patterning steps in which a thick portion and a thin portion are manufactured. In the mass production process of the silicon waveguide, in general, the waveguide is formed by pattern transfer using photolithography and by pattern formation using etching. At the present time, according to the accuracy in alignment of a mask used for photolithography, a shift of approximately a few nm to several tens of nm may occur in each of the patterning steps. When the waveguide is manufactured through the two patterning steps, a shift (a mask shift) occurs between the masks used for each of the steps.

The waveguide structure of the second waveguide portion 12 may not have a rectangular shape due to the mask shift. As such a case, for example, a case in which a part of the thin plate portion 15 is formed onto the side surface of the mode expansion portion 18 is shown in FIG. 1 and FIG. 2. At this time, a TE mode incident from the first waveguide portion 11 is not sufficiently rotated until a TM mode at the time of reaching the tip end of the polarization rotation portion 13, and is likely to be combined with the TE mode in the mode expansion portion 18. Boundary conditions of whether or not the polarization is sufficiently rotated are different according to the shape of the waveguide, and in general, when the thin plate portion 15 remains in the second waveguide portion 12, the polarization is insufficiently rotated as the aspect ratio of the core dimension in the rectangular shape of the tip end of the polarization rotation portion 13 becomes smaller.

In order to compensate for such a mask shift (in order to maintain properties even when there is a mask shift), as shown in FIG. 12, a portion in which the width of the waveguide of the rectangular waveguide 27 is constant (a portion in a section L4) can be arranged on the tapered tip end of the polarization rotation portion 13. The rectangular waveguide 27 has the same sectional structure as that of the second waveguide portion 12.

Figure 13:
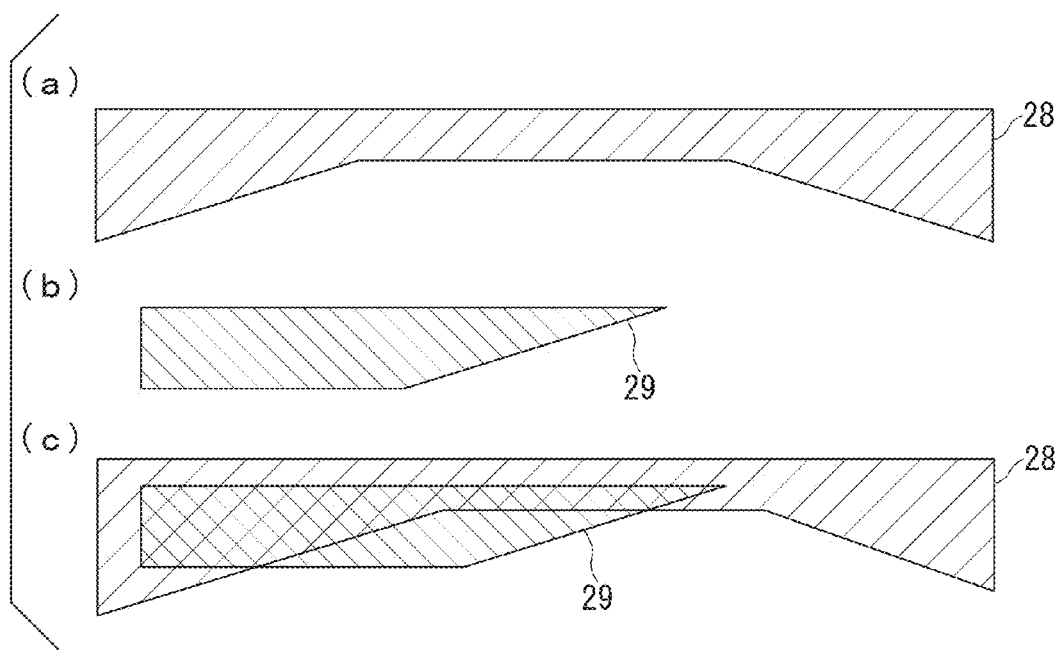
FIG. 13 view (a) is a top view showing an example of a mask pattern used for forming a thick plate portion, FIG. 13 view (b) is a top view showing an example of a mask pattern used for forming a thin plate portion, and FIG. 13 view (c) is a top view showing superposition of two mask patterns.
Figure 14:
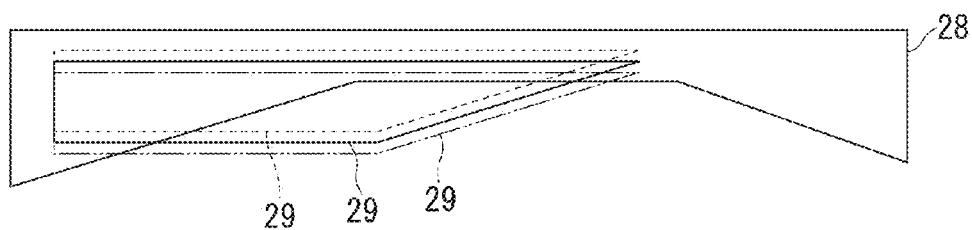
FIG. 14 is a top view showing a mask shift.

In FIG. 13(a), an example of a mask pattern 28 used for forming the thick plate portion 14 is shown. The mask pattern 28 is able to include the pattern of the thick plate portion 14 and the pattern of the second waveguide portion 12 (and the pattern of the mode expansion portion 18 or the like, as necessary). In addition, in FIG. 13 view (b), an example of a mask pattern 29 used for forming the thin plate portion 15 is shown. The mask pattern 29 includes the pattern of the thin plate portion 15, but does not include the pattern of the second waveguide portion 12 or the mode expansion portion 18. At the time of patterning, a portion in which the two mask patterns 28 and 29 are superposed is formed to be thick according to the mask pattern 28. In this case, as shown in FIG. 13 view (c), when the two mask patterns 28 and 29 are superposed, a waveguide structure shown in FIG. 12 is formed. In the polarization conversion element, in general, the longitudinal direction of the waveguide is greater than the width direction of the waveguide such that the rotation of the polarization is adiabatically changed. Accordingly, in the mask shift, an influence due to a shift in the width direction is significant. In the structure shown in FIG. 12, as shown by a broken line or a chained line of FIG. 14, even when a mask shift including a shift in the width direction occurs, the shape is not rapidly changed with respect to the waveguide direction of the light but is continuously changed. In addition, the thin plate portion 15 does not remain in the tip end portion of the polarization rotation portion 13 but is changed up to the rectangular waveguide 27, and thus it is possible to manufacture an element in which the polarization conversion is reliably performed.

Figure 15:
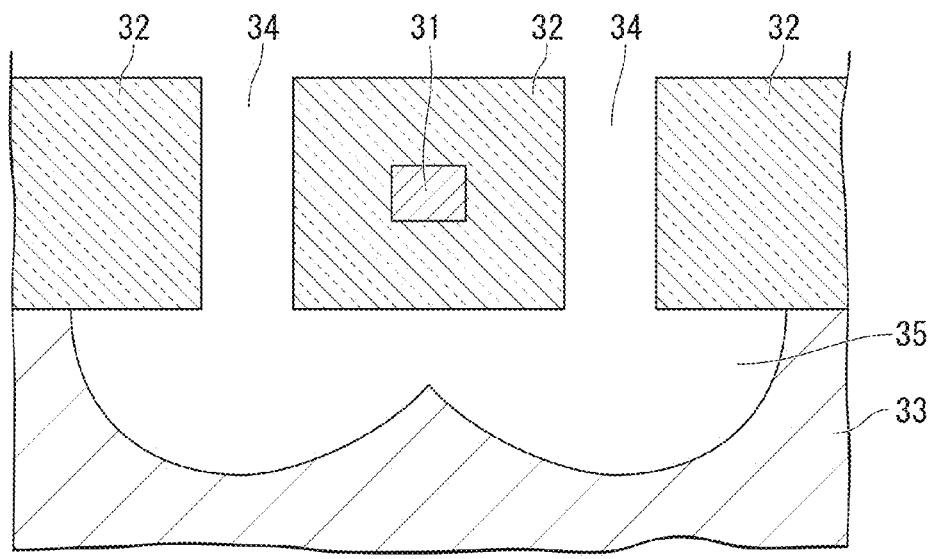
FIG. 15 is a sectional view showing an example of a ninth embodiment of the polarization conversion element of the present invention.

In FIG. 15, an example of a ninth embodiment of the polarization conversion element of the present invention is shown. The polarization conversion element of each of the embodiments described above uses a structure in which the width of the waveguide is narrowed, and thus when the sectional surface of the waveguide core is small with respect to a wavelength, light-trapping properties of the light become weak in a portion in which the width of the waveguide is narrow (in particular, the tip end of the polarization rotation portion 13 or the second waveguide portion 12), and the light propagating through the optical waveguide has a wider light distribution to the peripheral portion of the waveguide on a surface vertical to an advancing direction of the light. At this time, when the thickness of the cladding (the lower cladding) from the core to the substrate is thin, the light may be leaked into the substrate. In order to avoid such light leakage, for example, a suspended structure may be used as disclosed in Reference 1 (Qing Fang, Tsung-Yang Liow, Jun Feng Song, Chee Wei Tan, Ming Bin Yu, Guo Qiang Lo, and Dim-Lee Kwong, "Suspended optical fiber-to-waveguide mode size converter for silicon photonics," Optics Express, Vol. 18, Issue 8, pp. 7763-7769 (2010)). Accordingly, the light leakage into the substrate is reduced, and thus it is possible to realize a polarization conversion element with a smaller loss.

In a suspended structure shown in FIG. 15, a cladding 32 surrounding a core 31 includes slit-like gaps 34 and 34 on both sides of the core 31 in the width direction. Further, a trench 35 is formed between the cladding 32 and a substrate 33 in the lower portion of the core 31. The gaps 34 and 34 and the trench 35 are filled with air (or gas such as nitrogen gas) as in the upper portion of the cladding 32. A space between the substrate 33 and the cladding 32 is filled with a medium having a low refractive index such as air, and thus it is possible to reduce the light leakage to the substrate 33 from the cladding 32. Furthermore, in FIG. 13, the core 31 and the cladding 32 surrounding the core 31 are supported on the substrate 33 by disposing a portion in which the gaps 34 and 34 or the trench 35 do not exist on the front and the back of the cladding 32 in the longitudinal direction.

Figure 16:
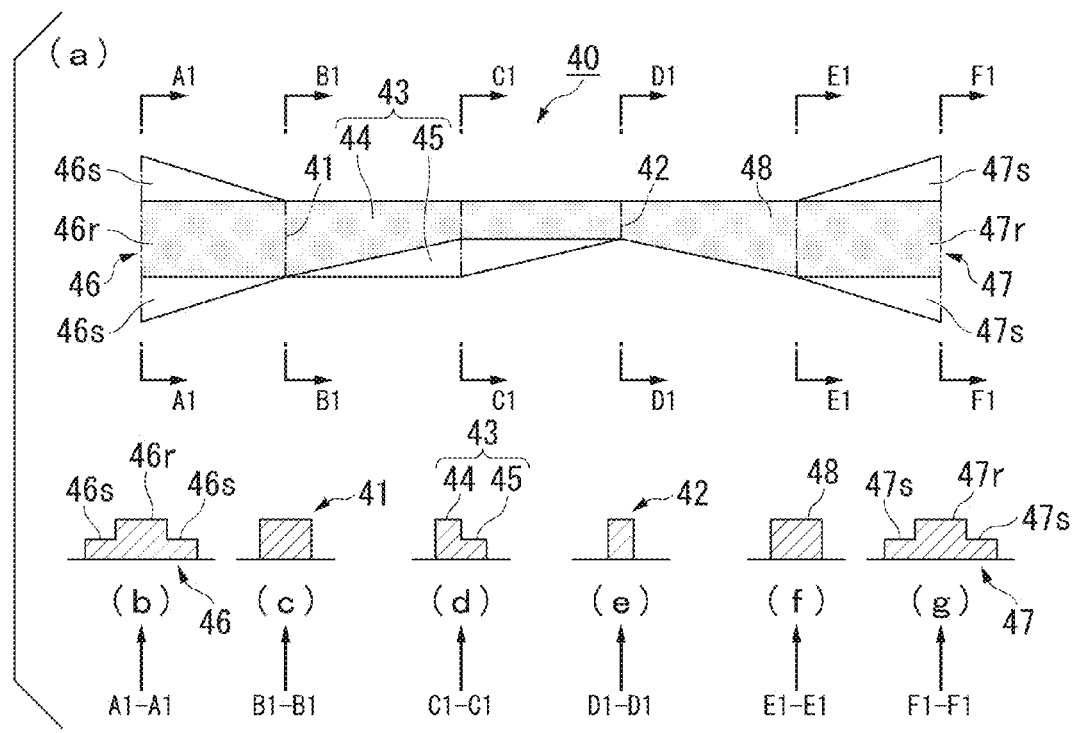
FIG. 16 view (a) is a top view showing an example of a tenth embodiment of the polarization conversion element of the present invention, FIG. 16 view (b) is a sectional view cut along line A1-A1, FIG. 16 view (c) is a sectional view cut along line B1-B1, FIG. 16 view (d) is a sectional view cut along line C1-C1, FIG. 16 view (e) is a sectional view cut along line D1-D1, FIG. 16 view (f) is a sectional view cut along line E1-E1, and FIG. 16 view (g) is a sectional view cut along line F1-F1.

In FIG. 16, an example of a tenth embodiment of the polarization conversion element of the present invention is shown. This polarization conversion element is configured of an optical waveguide in which a core formed of InGaAsP is arranged on an InP substrate. The InP substrate in the lower portion of the core is the lower cladding, and the upper portion and both sides of the core are surrounded by the upper cladding of $SiO_2$. In sectional views of FIG. 16 views (b) to (g), a horizontal line horizontally extending from the lower surface of the InGaAsP core indicates a boundary between an InP cladding and a $SiO_2$ cladding.

The width of a thin slab portion 46s of a rib type waveguide 46 is reduced between line A1-A1 to line B1-B1, and thus the thick rib portion 46r is connected to a first waveguide portion 41 of a polarization conversion element 40. The polarization conversion element 40 is equal to the polarization conversion element 10 of the first embodiment in that the core of a polarization rotation portion 43 includes a thick plate portion 44 and a thin plate portion 45 having a thickness thinner than that of the thick plate portion 44 and the width is changed between line B1-B1 to line D1-D1. A rib type waveguide 47 is further connected from a second waveguide portion 42 through a mode expansion portion 48. Rib portions 46r and 47r of the rib type waveguides 46 and 47 have the same thickness as that of the core of the polarization rotation portion 43 or the mode expansion portion 48. The thickness of slab portions 46s and 47s may be equal to the thickness of the thin plate portion 45 of the polarization rotation portion 43. In FIG. 16, the width of the rib portions 46r and 47r may be constant.

A difference in the refractive index between InP and InGaAsP is small (for example, the refractive index of InP is 3.17, and the refractive index of InGaAsP is different according to a composition ratio but approximately 3.4), and thus when the core width of the rib type waveguide is narrowed, the light-trapping properties of the light with respect to the core become weak in a step of narrowing the slab portion, and it may be difficult for the mode to propagate. For this reason, as shown in FIG. 17, it is possible to further decrease the width of the slab portion 46s and to increase the width of the rib portion 46r as it becomes closer to the first waveguide portion 41 in the rib type waveguide 46 connected to the first waveguide portion 41.

Figure 18:
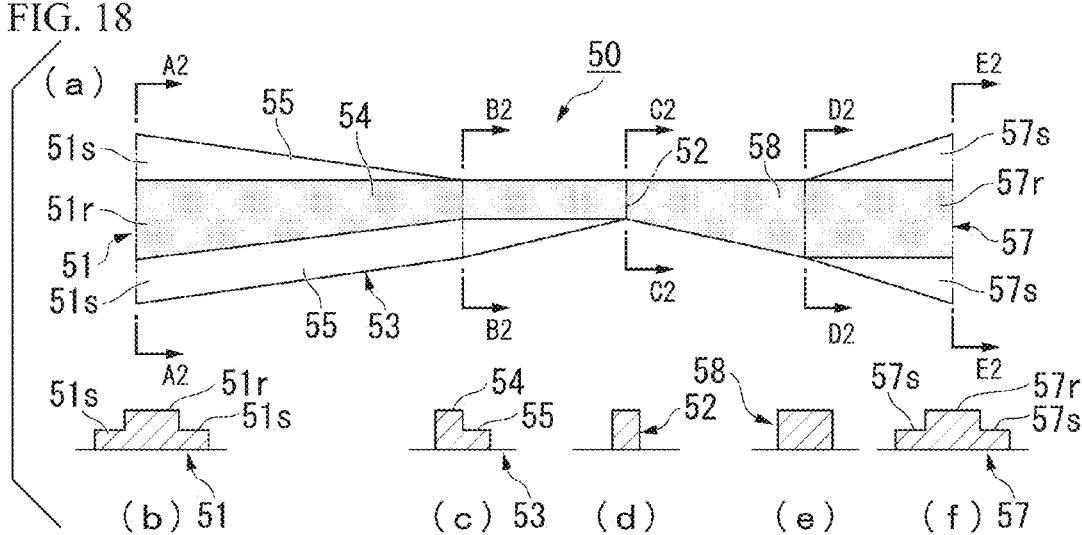
FIG. 18 view (a) is a top view showing another example of the tenth embodiment of the polarization conversion element of the present invention, FIG. 18 view (b) is a sectional view cut along line A2-A2, FIG. 18 view (c) is a sectional view cut along line B2-B2, FIG. 18 view (d) is a sectional view cut along line C2-C2, FIG. 18 view (e) is a sectional view cut along line D2-D2, and FIG. 18 view (f) is a sectional view cut along line E2-E2.

FIG. 18 is an example in which the core widths are collectively changed in sections A1 to C1 of FIG. 16 (in a part of the rib type waveguide 46, the first waveguide portion 41, and the polarization rotation portion 43). In sections A2 to B2 of FIG. 18, each of the widths of a rib portion 51r and a slab portion 51s of a first waveguide portion 51 is continuously changed to be a thick plate portion 54 and a thin plate portion 55 of a polarization rotation portion 53 in the longitudinal direction. The structures of a second waveguide portion 52 and a mode expansion portion 58 of the polarization conversion element 50, and a rib portion 57r and a slab portion 57s of a rib type waveguide 57 are equal to those of FIG. 16. In sectional views of FIGS. 18(b) to 18(f), a horizontal line horizontally extending from the lower surface of an InGaAsP core indicates a boundary between an InP cladding and a $SiO_2$ cladding.

Figure 17:
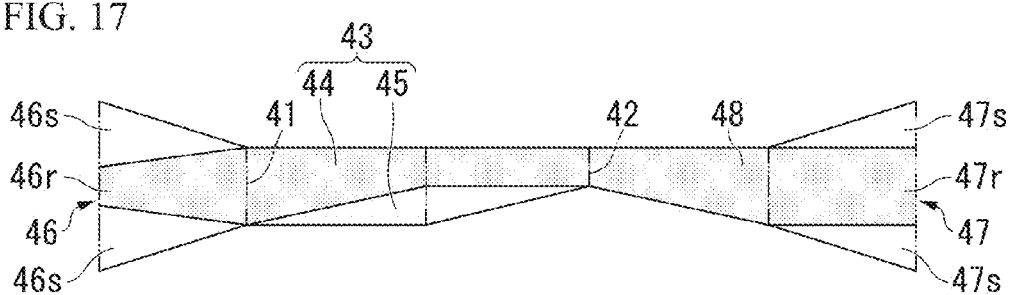
FIG. 17 is a top view showing another example of the tenth embodiment of the polarization conversion element of the present invention.

In any one of FIGS. 16 to 18, the length of each of the portions in the waveguide direction is designed such that the mode conversion is adiabatically performed.

Figure 19:
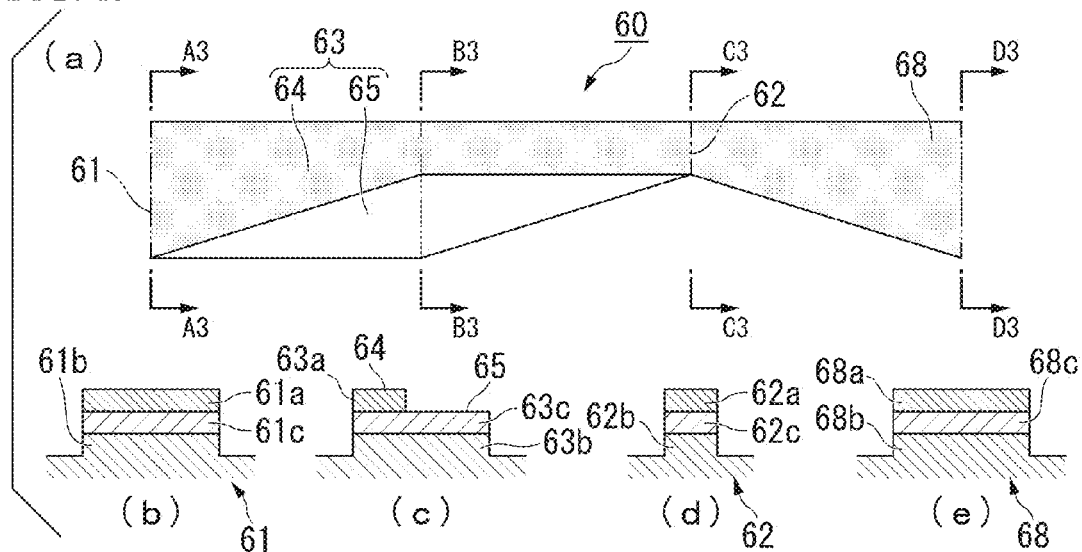
FIG. 19 view (a) is a top view showing an example of an eleventh embodiment of the polarization conversion element of the present invention, FIG. 19 view (b) is a sectional view cut along line A3-A3, FIG. 19 view (c) is a sectional view cut along line B3-B3, FIG. 19 view (d) is a sectional view cut along line C3-C3, and FIG. 19 view (e) is a sectional view cut along line D3-D3.

In FIG. 19, an example of an eleventh embodiment of the polarization conversion element of the present invention is shown. For example, in Reference 2 (Masaru Zaitsu, Takuo Tanemura, and Yoshiaki Nakano, "Efficiency and Fabrication Tolerance of Half-Ridge InP/InGaAsP Polarization Converters", The 18$^{th}$ Opto-Electronics and Communications Conference (2013), pp. WL3-1), a high mesa type waveguide using an InP waveguide is disclosed. The high mesa type waveguide has a structure in which a core and an upper cladding having a predetermined width are sequentially laminated on a lower cladding from the bottom, and both sides of the core and the upper cladding in the width direction are surrounded by air. The high mesa type waveguide has a structure in which a difference in the refractive index is significant in the width direction of the waveguide, and light-trapping properties and the like are strong.

In the first embodiment to the tenth embodiment, the core of the waveguide structure includes the thick plate portion and the thin plate portion having different heights. In a polarization conversion element 60 of the eleventh embodiment shown in FIG. 19, a portion in which an upper cladding 63a is laminated on a core 63c is set to a thick plate portion 64, and a portion in which the upper cladding 63a is not laminated on the core 63c is set to a thin plate portion 65. Upper claddings 61a, 62a, 63a, and 68a and lower claddings 61b, 62b, 63b, and 68b are formed of InP, and cores 61c, 62c, 63c, and 68c are formed of InGaAsP. The polarization conversion element 60 is the same as the polarization conversion element 10 of the first embodiment in that a polarization rotation portion 63 is disposed between a first waveguide portion 61 and a second waveguide portion 62, the waveguide structure of the polarization rotation portion 63 includes the thick plate portion 64 and the thin plate portion 65, and a mode expansion portion 68 is connected to the second waveguide portion 62.

In the waveguide structure of the polarization rotation portion 63, the sectional surface of a portion formed of the core and the upper cladding is asymmetric in the width direction, and the polarization can be rotated by including a portion which is also asymmetric in the height direction. In addition, the core and the upper cladding of the waveguide structure continuously exist between the thick plate portion 64 and the second waveguide portion 62 of the first waveguide portion 61 and the polarization rotation portion 63 with the same height, and thus the same structural characteristics as those of the first embodiment are obtained. In FIG. 19, the first waveguide portion 61, the second waveguide portion 62, and the mode expansion portion 68 are in a rectangular waveguide in which the widths of the core and the upper cladding are equal to each other.

The present embodiment is not limited to the examples, but a rib structure can also be used in which the thickness is reduced in the upper portion of the first waveguide portion 61 or the second waveguide portion 62. In addition, as the cladding surrounding the core and the upper cladding, it is also considered that $SiO_2$ is laminated as a protective film, or an air cladding is used. The material of the cladding can be determined in consideration of processes used in other devices integrated on the same substrate as that of the polarization conversion element 60.

The length of each of the portions in the waveguide direction is designed such that the mode conversion is adiabatically performed.

As described above, the present invention is described on the basis of preferred embodiments, but the present invention is not limited to the embodiments described above, and various modifications can be performed within a range not departing from the gist of the present invention.

By the same principle as that of the present invention, it is possible to separate a degeneration point at which a $TE_{2n}$ mode (n is an integer greater than or equal to 0) and a fundamental TM mode intersect with each other in a curve of an effective refractive index by a structure having asymmetry in the vertical direction and the horizontal direction of a waveguide formed of the same thin plate portion and the same thick plate portion as those of the present invention, and it is possible to perform the conversion by tapering the waveguide. Here, $TE_{2n}$ indicates a mode having the (2n+1)—the highest effective refractive index in TE modes (TE zero-order, TE first order, TE second order, . . . ). A TE1 mode is a $TE_{2n+1}$ mode of n=0 (an odd-order mode).

The reason that an even-order mode (a $TE_{2n}$ mode) of the TE modes is a conversion target is as follows. In a fundamental TM mode propagating through a rectangular core (a structure (a refractive index distribution) symmetric in both of the width direction and the height direction), an x component (Ex) in the electric field thereof is in an antisymmetrical distribution in both of the width direction and the height direction. In contrast, Ex of the even-order TE mode including TE0 is in an electric field distribution which is symmetric with respect to the width direction and is also symmetric with respect to the height direction. For this reason, the refractive index distribution is asymmetric with respect to both of the width direction and the height direction, and thus the symmetry of $TE_{2n}$ in the height direction and the width direction collapses, each of the modes are mixed with each other in the vicinity of the degeneration point due to an interaction with the fundamental TM mode, and the degeneration point is separated. For this reason, according to the same structure as that of the present invention, the $TE_2$ mode can be converted with respect to the fundamental TM mode.

In the present invention, "the waveguide structure" in the expression that the height of the "waveguide structure" is constant between the first waveguide portion, the thick plate portion of the polarization rotation portion, and the second waveguide portion, and in the expression that the thin plate portion in which the thickness of "the waveguide structure" is thinner than that of the thick plate portion is included in the polarization rotation portion may be "the core" as in the first embodiment, or may be "the core and the upper cladding" as in the eleventh embodiment. In addition, for example, a portion having a different height may be disposed on the cladding as the waveguide structure other than the core. In order to realize the polarization rotation by affecting the mode conversion with a change in the waveguide structure, it is preferable that a portion of the "waveguide structure" in which the height and the width are changed include the core or include a portion close to the core (for example, a part of the cladding).

Examples of the waveguide connected to the front and the back of the polarization conversion element include a rectangular waveguide, a rib type waveguide, a mode expansion portion, a mode conversion unit, a linear waveguide, a bending waveguide, and the like. It is preferable that these waveguides include the same waveguide structure as that of the polarization conversion element.

For example, when the polarization rotation portion in which the height and the width are changed is formed by setting the height of the core to be greater than or equal to two, it is preferable that the height of the core of the waveguide connected to the front and the back of the polarization conversion element be continuously connected to the height of the thick plate portion of the polarization rotation portion. In addition, when a portion including the upper cladding on the core is set to the thick plate portion, a portion not including the upper cladding on the core is set to the thin plate portion, and the polarization rotation portion in which the height and the width are changed is formed, it is preferable that the waveguide connected to the front and the back of the polarization conversion element have the same structure as that of the thick plate portion in which the upper cladding is disposed on the core.

EXAMPLES

Hereinafter, the present invention will be described in detail with reference to examples, but the present invention is not limited to the following examples.

Example 1

As shown in FIGS. 1 to 3, an optical waveguide having a structure in which the core includes the first waveguide portion 11, the polarization rotation portion 13, and the second waveguide portion 12, and the polarization rotation portion 13 includes the thin plate portion 15 on one side of the thick plate portion 14 is designed. In each of the dimensions, L1 is 10 µm, L2 is 20 µm, L3 is 20 µm, W1 is 400 nm, W2 is 200 nm, W3 is 200 nm, H1 is 300 nm, and H2 is 150 nm.

Figure 20:
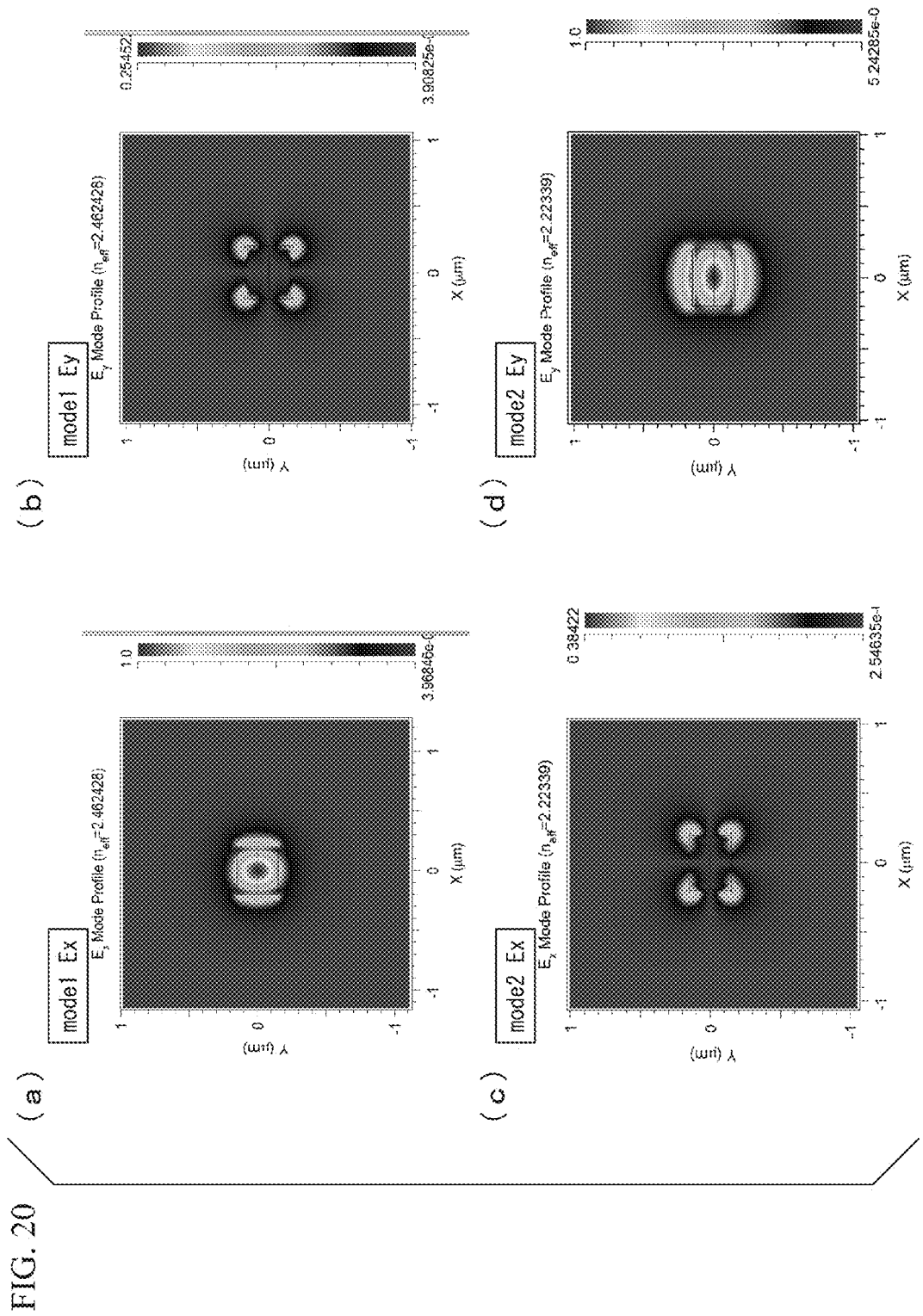
FIG. 20 diagrams (a) to (d) are diagrams showing an electric field distribution of a sectional surface A in Example 1.
Figure 21:
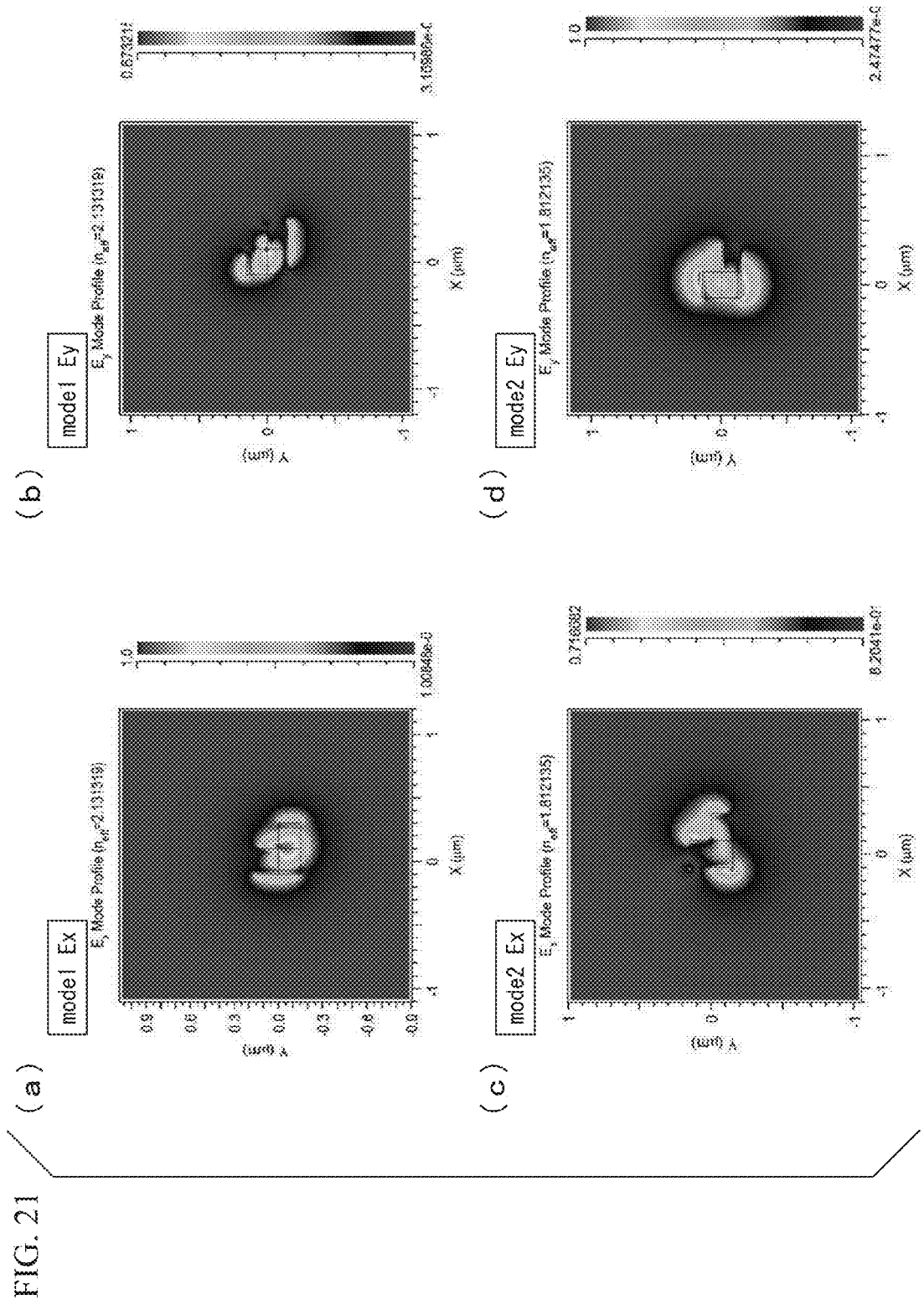
FIG. 21 diagrams (a) to (d) are diagrams showing an electric field distribution of a sectional surface B in Example 1.

An electric field distribution is calculated, and as a result thereof, an electric field distribution in the first waveguide portion 11 (the sectional surface A) is as shown in FIG. 20, an electric field distribution in the polarization rotation portion 13 (the sectional surface B) is as shown in FIG. 21, and an electric field distribution in the second waveguide portion 12 (the sectional surface C) is as shown in FIG. 23. For example, in FIG. 20, 98% of the intensity of the electric field is the Ex component. In the result of such an electric field distribution, a mode having the highest effective refractive index is set to a "mode 1", and a mode having the second highest effective refractive index is set to a "mode 2". In addition, in the electric field distribution, the result of the Ex component and the Ey component is shown in (a) to (d) with respect to each of the mode 1 and the mode 2.

Figure 25:
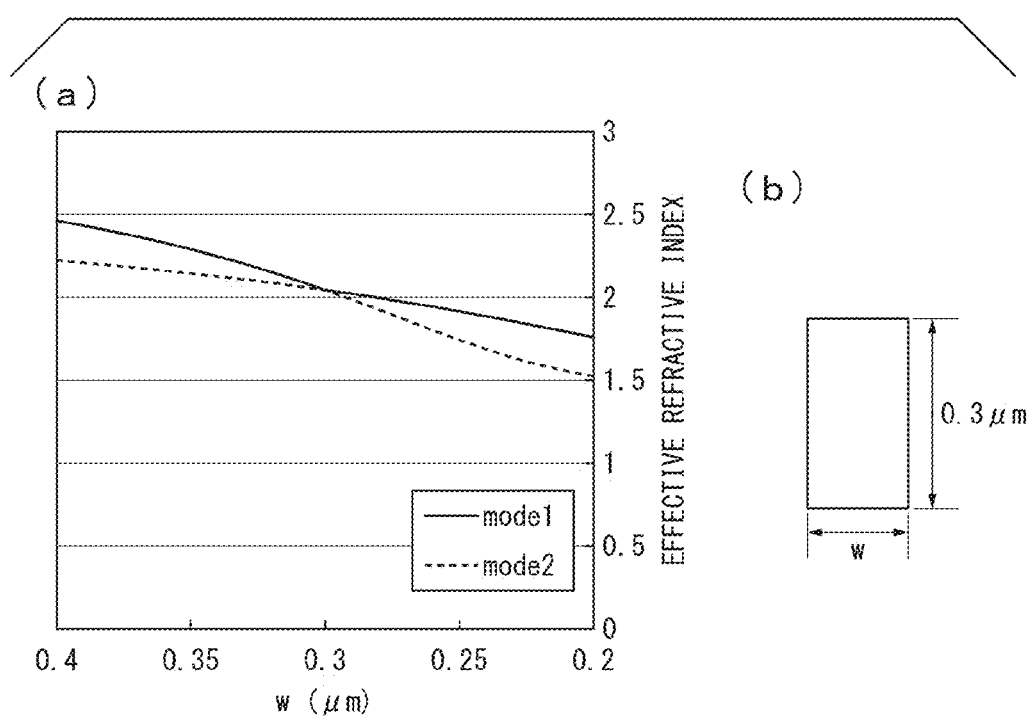
FIG. 25 graph (a) is a graph showing a change in an effective refractive index from the sectional surface C to a sectional surface D in Example 1, and FIG. 25 diagram (b) is a diagram showing a sectional structure thereof.

In the mode 1 and the mode 2, a change in the effective refractive index between the sectional surface A and the sectional surface B is shown in FIG. 22 graph (a), a change in the effective refractive index between the sectional surface B and the sectional surface C is shown in FIG. 24 graph (a), and a change in the effective refractive index between the sectional surface C and the sectional surface D is shown in FIG. 25 graph (a).

As shown in FIG. 22 graph (a) and FIG. 24 graph (a), the effective refractive indices of the two modes do not intersect with each other while moving from the sectional surface A to the sectional surface B, and from the sectional surface B to the sectional surface C, and thus the sequence of the mode 1 and the mode 2 is not changed. However, as shown in FIG. 20, in the first waveguide portion 11 (the sectional surface A), the mode 1 is TE and the mode 2 is TM, and as shown in FIG. 23, in the second waveguide portion 12 (the sectional surface C), the mode 1 is TM and the mode 2 is TE.

As shown in FIG. 25 graph (a), in the mode expansion portion 18, it is found that a core width w is equal to a core height when the core width is 0.3 μm, and the effective refractive indices of the mode 1 and the mode 2 are coincident with each other in the vicinity of a width of 0.3 μm.

The present structure is calculated by using a Finite-Difference Time Domain (FDTD) method. A wavelength is calculated at 1.55 μm. In a refractive index, the refractive index of $SiO_2$ is 1.45 and the refractive index of Si is 3.48. The results of the simulation are shown in Table 1.

When TE light is incident on an input port, the output is TM, and at this time, a loss is 0.05 dB. When TM light is incident on the input port, the output is converted into TE in an output port, and a polarization extinction ratio (PER) of greater than or equal to 22 dB can be ensured.

TABLE 1

| | | OUTPUT PORT (dB) | | PER |
|---|---|---|---|---|
| | | TE | TM | (dB) |
| INPUT PORT | TE | −24.2 | −0.05 | 23.7 |
| | TM | −0.22 | −24.2 | 22.0 |

Figure 26:
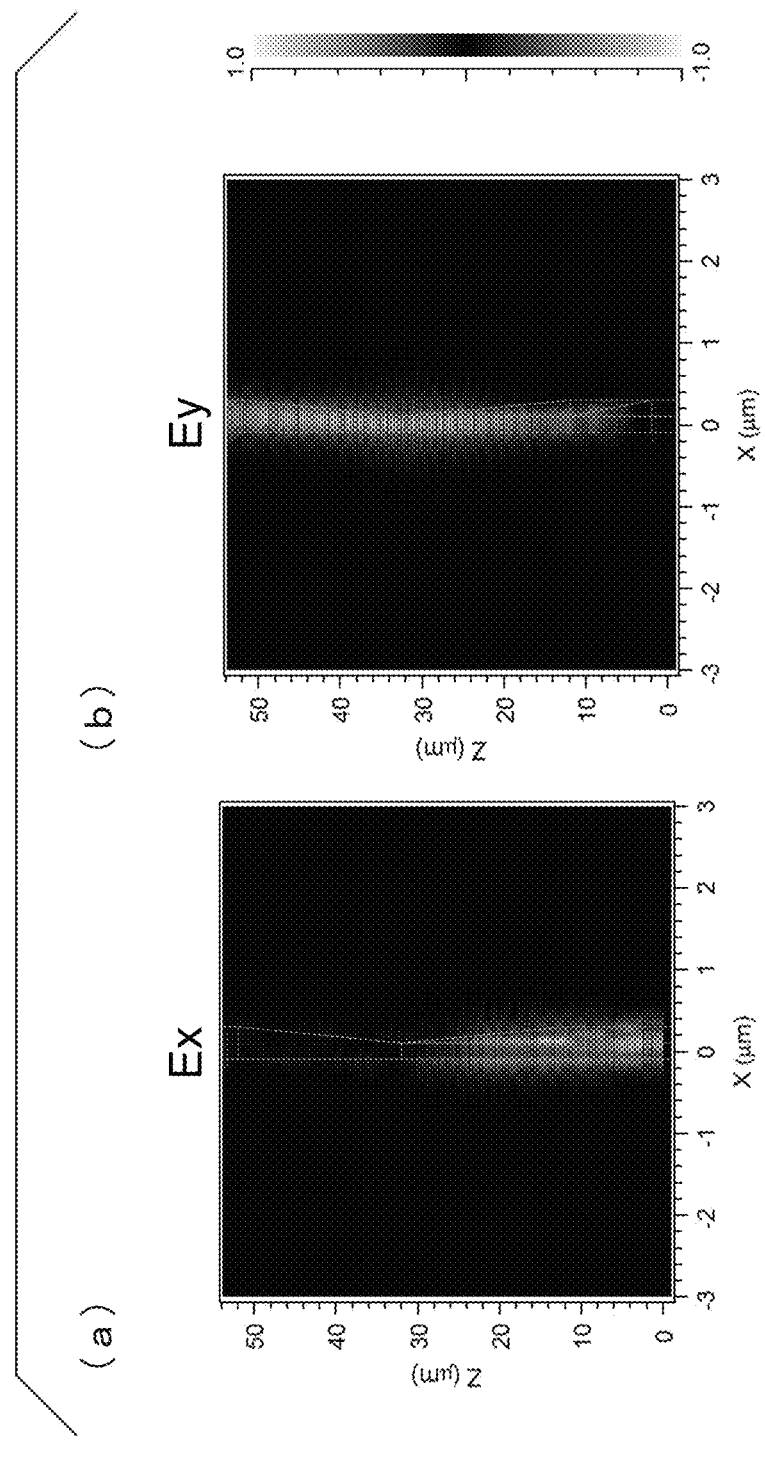
FIG. 26 diagrams (a) and (b) are diagrams showing an aspect of propagation in Example 1, in which FIG. 26 diagram (a) is a diagram showing an Ex component of an electric field, and FIG. 26 diagram (b) is a diagram showing an Ey component of the electric field.

At this time, the aspect of the propagation is shown in FIG. 26. In FIG. 26, an electric field distribution of the light when the TE mode is incident is shown from the bottom portion of the drawing. In FIG. 26 diagrams (a) and (b), the Ex component and the Ey component of each of the electric fields are shown. It is found that a main electric field is changed from Ex to Ey according to the propagation, and in the output unit, the mode is formed of only the Ey component and the TE mode is changed to the TM mode.

Example 2

When the thickness of a silicon core which is versatilely used in a silicon optical waveguide is 220 nm, a simulation result and a measurement result of a device which is actually manufactured are described as Example 2.

As shown in FIGS. 1 to 3, an optical waveguide having a structure in which the core includes the first waveguide portion 11, the polarization rotation portion 13, and the second waveguide portion 12, and the polarization rotation portion 13 includes the thin plate portion 15 on one side of the thick plate portion 14 is designed. The calculation is performed by using simulation software Fimmwave (manufactured by Photon Design Corporation) according to an Eigenmode expansion (EME) method. The wavelength of the light is 1550 nm. When each dimension of the device is based on conditions where L1 is 40 μm, L2 is 150 μm, L3 is 40 μm, H1 is 220 nm, H2 is 95 nm, W1 is 300 nm, W2 is 180 nm, and W3 is 120 nm, and the value of W2 is 160 nm and 180 nm, L2 is changed. The simulation results are shown in a graph of FIG. 27.

Figure 27:
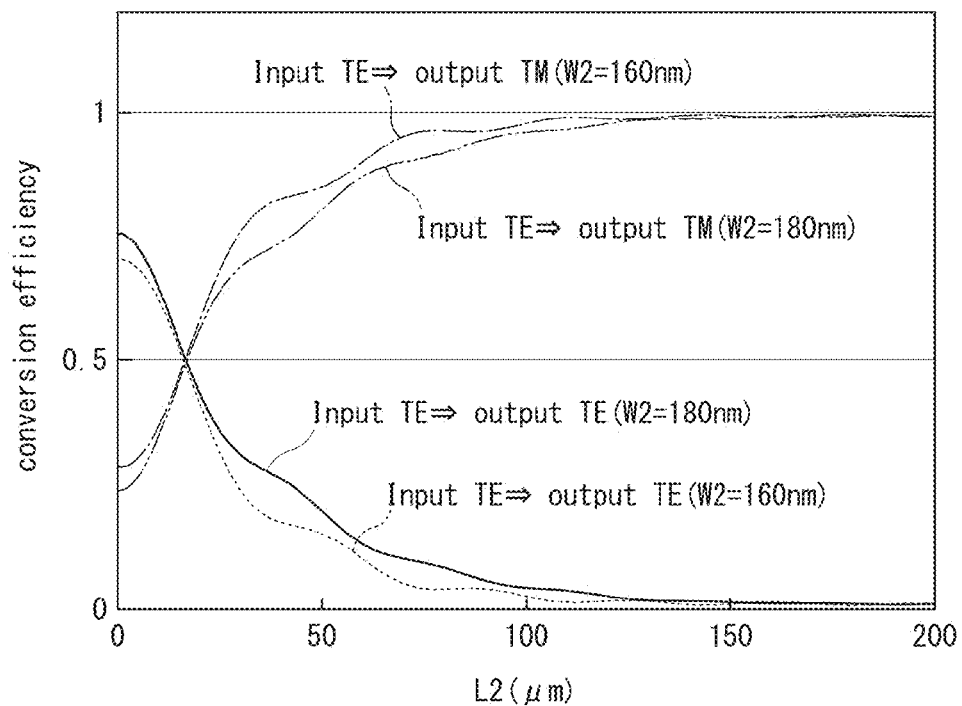
FIG. 27 is a graph showing a simulation result of Example 2.

A vertical axis of FIG. 27 indicates a value in which the emitting power of the TE mode and the TM mode which is emitted from the mode expansion portion 18 side is standardized, that is, conversion efficiency from the TE mode to each of the modes when the TE mode is incident from the first waveguide portion 11 side of FIG. 2. As shown in FIG. 27, a waveguide length L2 is sufficiently elongated, and thus the TE mode incident from the first waveguide portion 11 is adiabatically changed, and is changed to the TM mode at the time of being emitted to the second waveguide portion 12 side. Similarly, it is found that the TM mode incident from the second waveguide portion 12 is adiabatically changed, and is changed to the TE mode at the time of being emitted to the first waveguide portion 11 side. In addition, it is found that when the width W2 becomes narrower, adiabatic conversion occurs in a shorter distance (L2) compared to a case where W2 is 160 nm and W2 is 180 nm.

In the waveguide where a thickness H1 of the silicon core is 220 nm, in general, the core width of approximately 400 nm is used. The mode is widened as the core width becomes narrower. When the core width becomes narrower, and the mode becomes wider, a loss due to light scattering caused by roughness of a side wall which occurs at the time of manufacturing further increases. In addition, when the mode becomes wider, and the optical waveguide is formed on an SOI substrate, a silicon layer of the substrate exists in the lower portion of the optical waveguide. Therefore, light leakage occurs in the silicon layer. When the loss increases, a suitable and optimal waveguide width and a suitable and optimal waveguide length can be selected in consideration of conditions of the length necessary for the adiabatic change.

Figure 28:
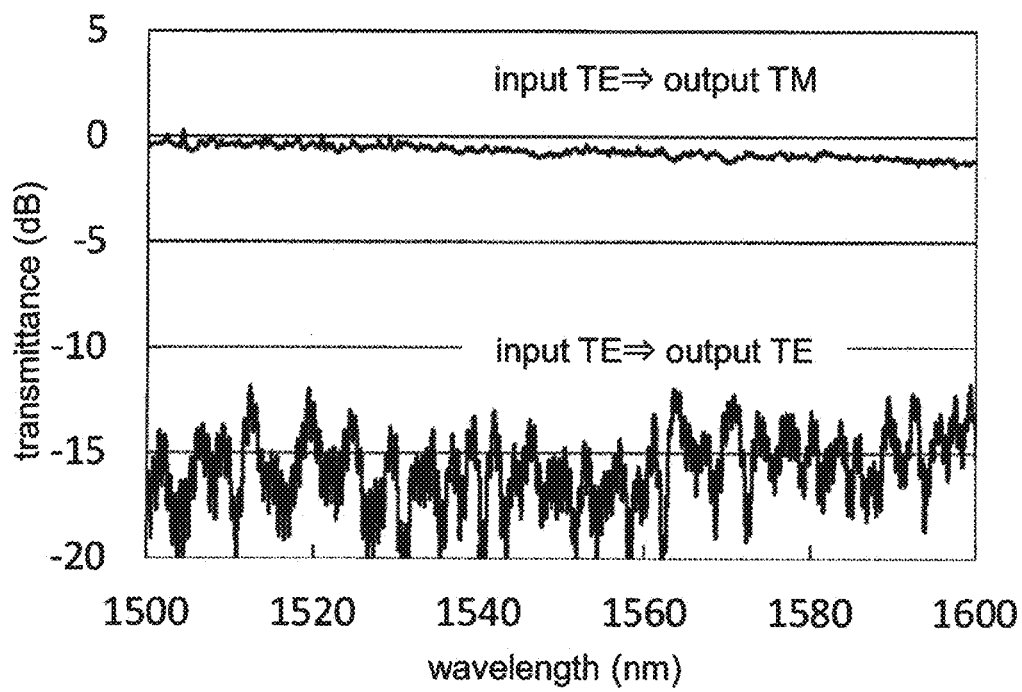
FIG. 28 is a graph showing a measurement result of coupling power of an optical waveguide manufactured in Example 2.

Further, an optical waveguide is manufactured by using an SOI substrate in which the thickness of the silicon layer in the upper portion is 220 nm, and the thickness of a BOX layer is 2 μm. In this preparation, L2 is 150 μm and W2 is 180 nm on the basis of the simulation result. The results of measuring coupling power (dB) of the TE mode and the TM mode emitted from the second waveguide portion (the mode expansion portion) side by allowing the TE mode to be incident on the first waveguide portion are shown in FIG. 28. The coupling power is the value of a difference with reference to a linear waveguide not having a polarization conversion structure. From FIG. 28, it is found that the polarization conversion from TE to TM can be realized over a wide range of wavelengths of 1500 nm to 1600 nm. In addition, in this wavelength range, a polarization extinction ratio (a difference in the dB value of the coupling power of "Input TE=>Output TM" and "Input TE=>Output TE") of greater than or equal to 10 dB is confirmed.

Example 3

Figure 29:
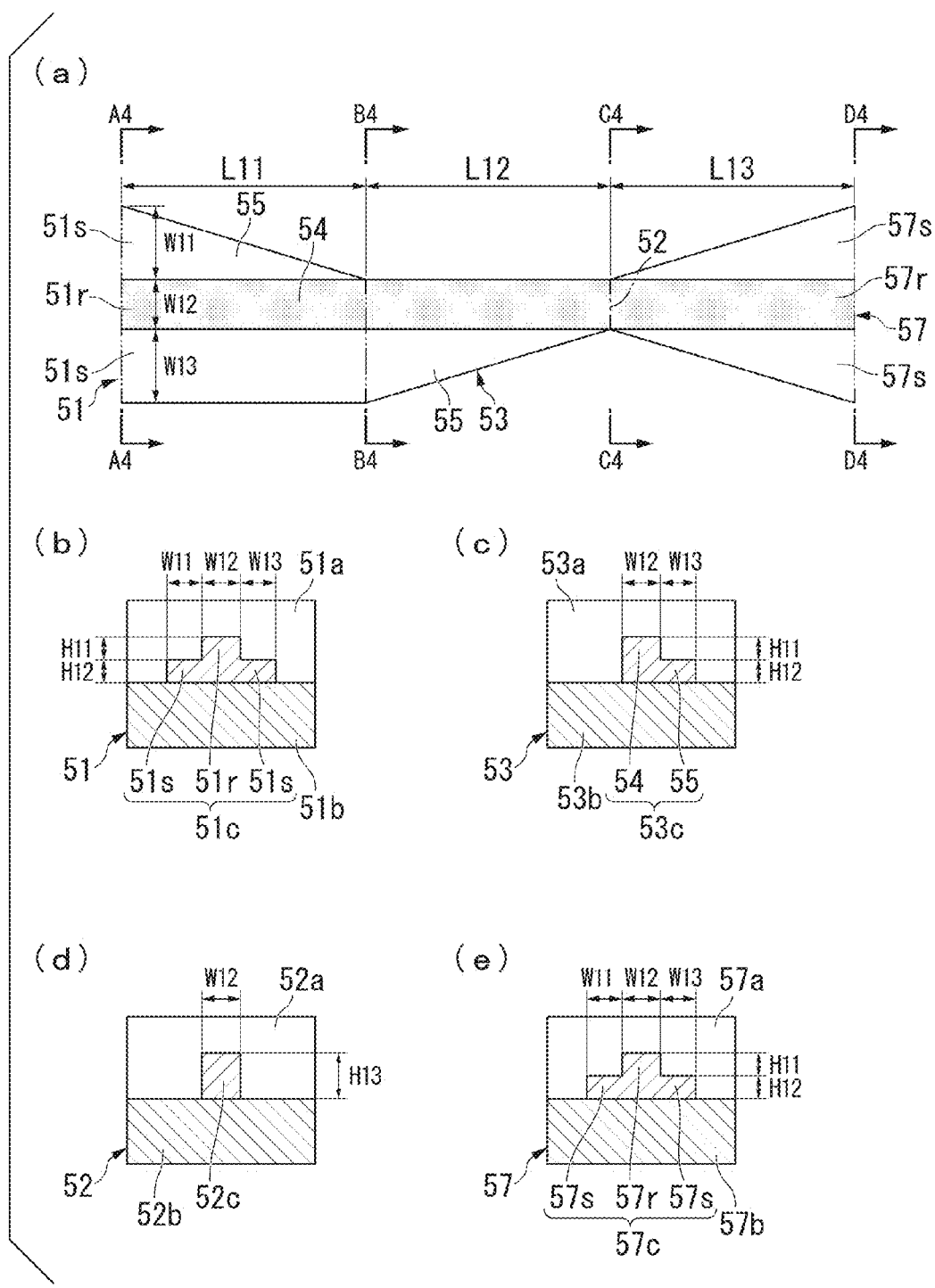
FIG. 29 view (a) is a top view showing an optical waveguide element of Example 3, FIG. 29 view (b) is a sectional view cut along line A4-A4, FIG. 29 view (c) is a sectional view cut along line B4-B4, FIG. 29 view (d) is a sectional view cut along line C4-C4, and FIG. 29 view (e) is a sectional view cut along line D4-D4.

A polarization conversion element using the InP-based optical waveguide according to the tenth embodiment is designed as Example 3. In FIG. 29, the structure of the present example is shown. In the present structure, the mode expansion portion 58 is omitted from the structure of FIG. 18, and the width is constant from the rib portion 51r of the first waveguide portion 51 to the rib portion 57r of the rib type waveguide 57 connected to the second waveguide portion 52 through the thick plate portion 54 of the polarization rotation portion 53.

Furthermore, it is assumed that the polarization conversion element of the present example is used by being connected to the waveguide disposed around the polarization conversion element (on the front and the back of the polarization conversion element in the longitudinal direction), and a waveguide in which the width of the thick plate portion and the thin plate portion is changed into a tapered shape is connected to the sectional surface of A4-A4 or the sectional surface of D4-D4 of the present example (for example, refer to FIG. 16 view (a), FIG. 17, and FIG. 18 view (a)). Therefore, it is assumed that the light is able to propagate through the waveguide around the polarization conversion element without a loss.

Among substrates 51b, 52b, 53b, and 57b existing in the lower portion of cores 51c, 52c, 53c, and 57c of each of the portions, and upper claddings 51a, 52a, 53a, and 57a covering the side portion and the upper portion of the cores 51c, 52c, 53c, and 57c, a portion in the vicinity of the core is shown in sectional views of FIG. 29 view (b) to (e). The substrates 51b, 52b, 53b, and 57b function as the lower cladding.

In the polarization rotation portion 53, the width of the thin plate portion 55 in the upper portion of FIG. 29(a) is linearly reduced from W11 to 0 in a range from the first waveguide portion 51 to a length L11. In a range of the next length L12, the thin plate portion 55 exists only on one side of the thick plate portion 54. In addition, the width of the thin plate portion 55 in the lower portion of FIG. 29 view (a) is constant as W13 in the range from the first waveguide portion 51 to the length L11, and the width is linearly reduced from W13 to 0 in the range of the next length L12. In a range from the second waveguide portion 52 having a rectangular sectional surface to a length L13, the width of each of the slab portions 57s and 57s linearly increases on both sides of the rib portion 57r in the width direction.

H11 is the height of the slab portions 51s and 57s and the thin plate portion 55. H12 is a difference of H13−H11. H13 is the height of the rib portions 51r and 57r and the thick plate portion 54.

W11 is the maximum width of the slab portions 51s and 57s in the upper portion of FIG. 29 view (a). W12 is the width of the rib portions 51r and 57r, the thick plate portion 54, and the second waveguide portion 52. W13 is the maximum width of the slab portions 51s and 57s in the lower portion of FIG. 29 view (a).

In the present example, when InGaAsP on the InP substrate is the core, and the upper cladding is $SiO_2$, the calculation is performed. The refractive indices of InP and $SiO_2$ are 3.17 and 1.45, respectively. In addition, it is known that the refractive index of InGaAsP is changed according to a composition ratio, and here, the refractive index of InGaAsP is calculated as 3.4.

Each of dimensions of FIG. 29 views (a) to (e) is as follows. W11 is 1 μm, W12 is 0.8 μm, W13 is 1 μm, H11 is 1.045 μm, H12 is 0.62 μm, H13 of H11+H12 is 1.665 μm, L11 is 300 μm, L12 is 600 μm, and L13 is 100 μm.

In the simulation, the calculation is performed by using simulation software Fimmwave (Manufactured by Photon Design Corporation) according to an Eigenmode Expansion (EME) method. The wavelength of the light is 1550 nm. The simulation results are shown in Table 2. From the results, it is confirmed that the polarization rotation can be performed by a polarization conversion element using an InP-based optical waveguide in which a difference in the refractive index between InP of the substrate and InGaAsP of the waveguide is comparatively small.

TABLE 2

|  |  | OUTPUT PORT (dB) | | PER |
|---|---|---|---|---|
|  |  | TE | TM | (dB) |
| INPUT PORT | TE | −14.64 | −0.22 | 14.4 |
|  | TM | −0.23 | −14.61 | 14.4 |

Example 4

Figure 30:
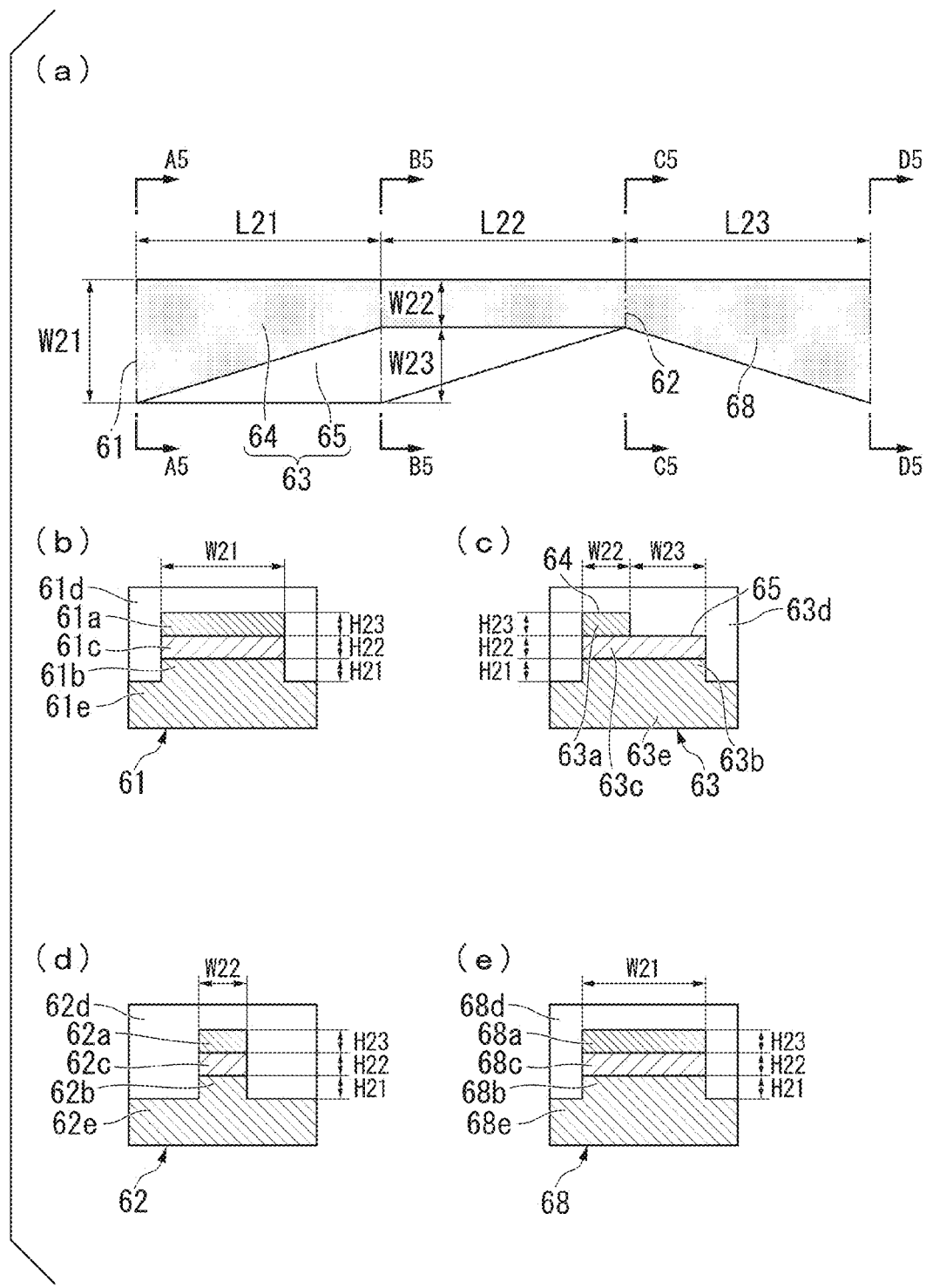
FIG. 30 view (a) is a top view showing an optical waveguide element of Example 4, FIG. 30 view (b) is a sectional view cut along line A5-A5, FIG. 30 view (c) is a sectional view cut along line B5-B5, FIG. 30 view (d) is a sectional view cut along line C5-C5, and FIG. 30 view (e) is a sectional view cut along line D5-D5.

Next, a structure shown in FIG. 30 is designed as an example of the eleventh embodiment, and the simulation is performed. The present structure is the same as the structure of FIG. 19, and in sectional views of FIG. 30 views (b) to (e), claddings 61d, 62d, 63d, and 68d are shown on both sides of a high mesa structure (the core, the upper cladding, and the lower cladding) in the width direction. H21 is the height of the lower claddings 61b, 62b, 63b, and 68b protruding from the upper surface of the substrates 61e, 62e, 63e, and 68e. H22 is the thickness of the cores 61c, 62c, 63c, and 68c. H23 is the thickness of the upper claddings 61a, 62a, 63a, and 68a. The definition of each of W21, W22, W23, L21, L22, and L23 is the same as the definition of each of W1, W2, W3, L1, L2, and L3 of FIG. 2.

In the present example, when InGaAsP on the InP substrate is the core, the upper cladding is InP, and the cladding having a high mesa structure on both sides in the width direction is $SiO_2$, the calculation is performed.

Even in the present example, the refractive indices of InP, InGaAsP, and $SiO_2$ are as shown in Example 3 described above. In addition, the same calculation method is used. In each of dimensions of the structure, W21 is 1.5 μm, W22 is 0.9 μm, W23 is 0.6 μm, H21 is 1 μm, H22 is 0.5 μm, H23 is 1 μm, L21 is 200 μm, L22 is 700 μm, and L23 is 100 μm. Simulation results are shown in Table 3. From the results, it is confirmed that the polarization rotation can be realized by applying the present invention to the high mesa structure of the present structure.

TABLE 3

|  |  | OUTPUT PORT (dB) | | PER |
|---|---|---|---|---|
|  |  | TE | TM | (dB) |
| INPUT PORT | TE | −13.26 | −0.26 | 13.0 |
|  | TM | −0.25 | −13.27 | 13.0 |

The polarization conversion element of the present invention can be used in an element for polarization conversion, for example, with respect to the structure of the optical waveguide element manufactured on the substrate.

The invention claimed is:
1. A polarization conversion element comprising an optical waveguide formed on a substrate,
the optical waveguide comprising sequentially a first waveguide portion, a polarization rotation portion, and a second waveguide portion, wherein:
in the first waveguide portion, an eigen mode of waveguide light on a sectional surface of the first waveguide portion comprises at least one TE mode and one TM mode, and an effective refractive index of the TE mode having the highest effective refractive index is higher than an effective refractive index of the TM mode having the highest effective refractive index;

in the second waveguide portion, an eigen mode of waveguide light on a sectional surface of the second waveguide portion comprises at least one TE mode and one TM mode, and an effective refractive index of the TM mode having the highest effective refractive index is higher than an effective refractive index of the TE mode having the highest effective refractive index;

a height of a waveguide structure of the first waveguide portion and a height of a waveguide structure of the second waveguide portion are equal to each other;

a waveguide structure of the polarization rotation portion has at least two heights in a height direction from the substrate, and the waveguide structure comprises a thick plate portion having the same height as that of the waveguide structure of the first waveguide portion and the second waveguide portion, and a thin plate portion having a thickness thinner than that of the thick plate portion;

the waveguide structure of the polarization rotation portion comprises a portion of which a sectional surface is asymmetric in a width direction and is also asymmetric in a height direction;

waveguide structures having the same height continuously exist between the waveguide structure of the first waveguide portion, the thick plate portion of the polarization rotation portion, and the waveguide structure of the second waveguide portion; and the polarization rotation portion has a length of the longitudinal direction that allows an mode conversion to be performed adiabatically.

2. The polarization conversion element according to claim 1, wherein a width of the thin plate portion of the polarization rotation portion is continuously changed toward the second waveguide portion.

3. The polarization conversion element according to claim 1,
wherein a width of the waveguide structure is continuously changed without comprising a discontinuous point between the first waveguide portion, the polarization rotation portion, and the second waveguide portion, along a waveguide direction.

4. The polarization conversion element according to claim 1,
wherein the sectional surface of the waveguide structure of the first waveguide portion is in the shape of a rectangle in which the width direction is larger than the height direction.

5. The polarization conversion element according to claim 1,
wherein the waveguide structure of the first waveguide portion is a rib type structure including a thick rib portion and a thin slab portion.

6. The polarization conversion element according to claim 5,
wherein a height of the thick plate portion of the polarization rotation portion is equal to a height of the rib portion, and a height of the thin plate portion is equal to a height of the slab portion.

7. The polarization conversion element according to claim 1,
wherein the sectional surface of the waveguide structure of the second waveguide portion is in the shape of a rectangle in which the width direction is smaller than the height direction.

8. The polarization conversion element according to claim 1,
wherein the waveguide structure of the second waveguide portion continuously comprises a portion of which a sectional surface linearly extending with a constant width is in the shape of a rectangle in the thick plate portion.

9. The polarization conversion element according to claim 1,
wherein the waveguide structure of the second waveguide portion is a rib type structure comprising a thick rib portion and a thin slab portion.

10. The polarization conversion element according to claim 1,
wherein the eigen mode of the waveguide light on the sectional surface of the first waveguide portion comprises one TE mode and one TM mode, or comprises at least two TE modes and one TM mode having an effective refractive index higher than that of the TE mode having the second highest effective refractive index.

11. The polarization conversion element according to claim 1,
wherein the second waveguide portion is connected to a mode expansion portion in which a width of a waveguide structure expands along a direction away from the polarization rotation portion.

12. The polarization conversion element according to claim 1,
wherein any one or both of the first waveguide portion and the second waveguide portion is connected to a tapered mode conversion unit in which a width of a waveguide structure becomes narrower along a direction away from the polarization rotation portion.

13. The polarization conversion element according to claim 1,
wherein a lower surface of the thick plate portion and a lower surface of the thin plate portion of the polarization rotation portion have the same height from the substrate.

14. The polarization conversion element according to claim 1,
wherein an upper surface of the thick plate portion and an upper surface of the thin plate portion of the polarization rotation portion have the same height from the substrate.

15. The polarization conversion element according to claim 1,
wherein the waveguide structure is a core.

16. The polarization conversion element according to claim 1,
wherein the waveguide structure is formed of a core and an upper cladding which is laminated on the core and has a width of less than or equal to a width of the core.

17. A DP-QPSK modulator comprising the polarization conversion element according to claim 1.

* * * * *